(12) United States Patent
Homma et al.

(10) Patent No.: US 7,644,244 B2
(45) Date of Patent: Jan. 5, 2010

(54) STORAGE SYSTEM AND SNAPSHOT MANAGEMENT METHOD

(75) Inventors: Yukiko Homma, Odawara (JP); Koji Nagata, Kaisei (JP); Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 514 days.

(21) Appl. No.: 11/377,781

(22) Filed: Mar. 17, 2006

(65) Prior Publication Data

US 2007/0150677 A1 Jun. 28, 2007

(30) Foreign Application Priority Data

Dec. 28, 2005 (JP) ............................. 2005-377491

(51) Int. Cl.
*G06F 13/00* (2006.01)
(52) U.S. Cl. ........................................ 711/162; 707/204
(58) Field of Classification Search ........................ None
See application file for complete search history.

(56) References Cited

U.S. PATENT DOCUMENTS

| | | | | |
|---|---|---|---|---|
| 5,742,792 A | * | 4/1998 | Yanai et al. .................. | 711/162 |
| 6,131,148 A | * | 10/2000 | West et al. .................. | 711/162 |
| 6,813,683 B2 | | 11/2004 | Tabuchi et al. | |
| 2002/0107877 A1 | * | 8/2002 | Whiting et al. .............. | 707/204 |
| 2004/0199733 A1 | | 10/2004 | Watanabe et al. | |
| 2005/0015663 A1 | | 1/2005 | Armangau et al. | |
| 2005/0198455 A1 | * | 9/2005 | Yagawa et al. .............. | 711/162 |
| 2005/0210209 A1 | * | 9/2005 | Nagata ....................... | 711/162 |
| 2005/0223170 A1 | * | 10/2005 | Ushijima et al. ............ | 711/114 |

FOREIGN PATENT DOCUMENTS

JP    2001-209565    8/2001
JP    2001-331378    11/2001

* cited by examiner

*Primary Examiner*—Reginald G Bragdon
*Assistant Examiner*—Larry T Mackall
(74) *Attorney, Agent, or Firm*—Brundidge & Stanger, P.C.

(57) ABSTRACT

A highly advantageous storage system and a snapshot management method. In the storage system, write target data sent from a host computer to a first storage controller is duplicated and stored in the first storage controller and also in a second storage controller; when the first storage controller receives a request from the host computer to create a snapshot in the second storage controller, it suspends transferring differential data to the second storage controller, creates a new first snapshot, and transfers differential data for the created first snapshot together with the untransferred differential data for a previous first snapshot for which transferring had been suspended, to the second storage controller.

16 Claims, 17 Drawing Sheets

25
- INTERNAL COPY EXECUTION PROGRAM — 60
- REMOTE COPY EXECUTION PROGRAM — 61
- CONTROL PROGRAM — 62
- VOLUME MANAGEMENT TABLE — 63

| VOL-ID | PATH INFORMATION | VOL TYPE | POOL VOL FLAG | PAIR INFORMATION |
|---|---|---|---|---|
| 1 | | | | |
| 2 | | | | |
| 3 | | | | |
| 4 | | | | |
| | | | | |

FIG.5

| | ACTION | PRIMARY VOL | VIRTUAL VOL | SNAPSHOT MANAGEMENT INFORMATION | SECONDARY VOL | VIRTUAL VOL |
|---|---|---|---|---|---|---|
| TIME t0 | PRIMARY VOL-VIRTUAL VOL SPLIT TIME | IMAGE T0 [A] | IMAGE T0 (SIZE=0) | INFORMATION FOR RESTORING IMAGE T0 | — | — |
| TIME t1 | REMOTE COPY EXECUTION | IMAGE T1 [B] | IMAGE T0 [A] | INFORMATION FOR RESTORING IMAGE T0 | — | — |
| TIME t2 | REMOTE COPY COMPLETE | IMAGE T2 [B][C] | IMAGE T0 [A] | INFORMATION FOR RESTORING IMAGE T0 | IMAGE T0 [A] | — |
| TIME t3 | PRIMARY VOL-VIRTUAL VOL SPLIT TIME | IMAGE T3 [B][D] | IMAGE T3 (SIZE=0) | INFORMATION FOR RESTORING IMAGE T3 | IMAGE T0 [A] | — |
| TIME t4 | REMOTE COPY EXECUTION | IMAGE T4 [B][E] | IMAGE T3 [D] | INFORMATION FOR RESTORING IMAGE T3 | IMAGE T0 [A] | — |
| TIME t5 | REMOTE COPY COMPLETE | IMAGE T5 [F][E] | IMAGE T3 [B][D] | INFORMATION FOR RESTORING IMAGE T3 | IMAGE T3 [B][D] | IMAGE T3 [A] |
| TIME t6 | PRIMARY VOL-VIRTUAL VOL SPLIT TIME | IMAGE T6 [G][E] | IMAGE T6 (SIZE=0) | INFORMATION FOR RESTORING IMAGE T6 | IMAGE T3 [B][D] | IMAGE T3 [A] |
| ... | ... | ... | ... | ... | ... | ... |

FIG.17
(A)
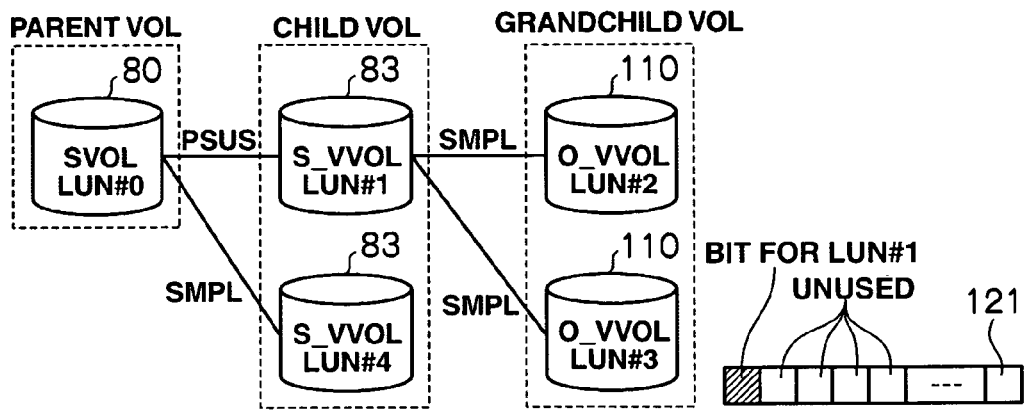
(B)
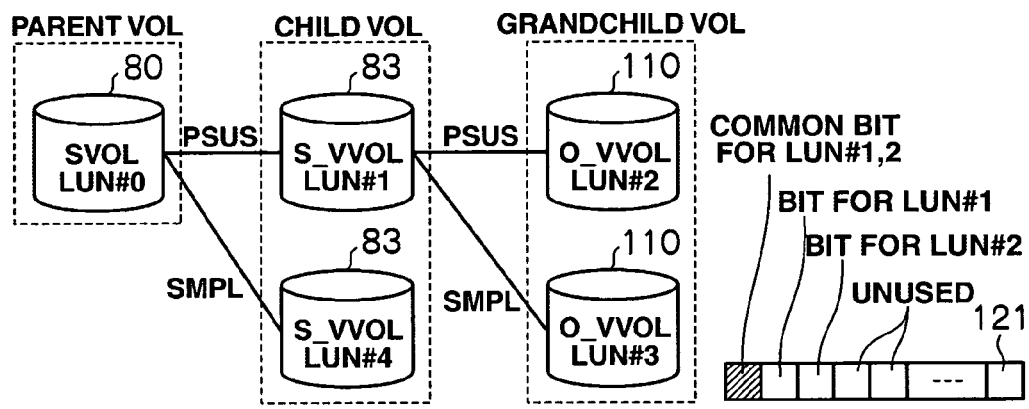
(C)
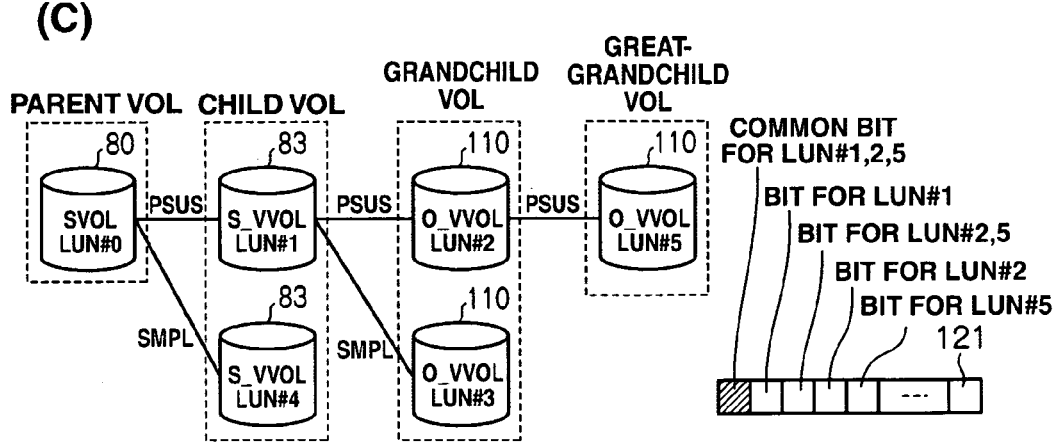

STORAGE SYSTEM AND SNAPSHOT MANAGEMENT METHOD

CROSS REFERENCES TO RELATED APPLICATION

This application relates to and claims priority from Japanese Patent Application No. 2005-377491, filed on Dec. 28, 2005, the entire disclosure of which is incorporated herein by reference.

BACKGROUND OF THE INVENTION

The present invention relates to a storage system and a snapshot management method, and is preferably applied in a storage system composed of a plurality of storage controllers having the so-called snapshot function and remote copy function.

Some conventional storage controllers have the so-called snapshot function in order to retain a data image (snapshot) of a logical volume at a certain point in time. Examples of methods that have been proposed for creating snapshots in those types of storage controllers include: a first snapshot creation method whereby only the difference between a source logical volume and an updated logical volume is stored; and a second snapshot creation method whereby data is duplicated and stored in two logical volumes and, when creating a snapshot, duplication is stopped and the logical volume for which updating has been stopped is provided as a snapshot.

Also, regarding the above second snapshot creation method, it has been suggested, as in Japanese Patent Laid-Open Publications No. 2001-331378 and No. 2001-209565, to also provide a logical volume for temporarily storing snapshots and use it as a buffer when storing, in a medium such as a tape or the like, data in the logical volume provided as a snapshot. With this method, it is possible to reduce the duplication suspension time for creating a snapshot, reduce the amount of original data copied to a mirror destination logical volume during mirror resynchronization, and to reduce mirror resynchronization time, during which a database program's data access performance is reduced.

Meanwhile, storage systems having the so-called remote copy function have been in practical use; in those systems, data is duplicated and stored in both a primary-side storage controller and a sub-side storage controller respectively located at a main center and a remote center with a distance of from one to several hundreds of kilometers therebetween, in order to protect data in case of natural disasters such as earthquakes, fires, and floods as well as terrors.

Remote copy functions are roughly divided into two types—synchronous and asynchronous. With the synchronous type remote copy function, remote copy is performed in such a manner that write completion is reported to a host system when data has been written in both a primary-side storage controller and a sub-side storage controller. Whereas, with the asynchronous type remote copy function, remote copy is performed in such a manner that write completion is reported to the host system when data has been written in the primary-side storage controller, and the data is transferred to the sub-side storage controller at another time.

In a conventional storage system having the above-described remote copy function, if there is more than one storage controller at both a primary site and a sub site, the primary-side storage controllers and their corresponding sub-side storage controllers are separately and independently connected to each other via communication links to enable remote copying. Accordingly, if the main center where the primary-side storage controllers are located loses functionality, it is difficult to ensure consistency of data between the main and remote centers unless each piece of the data is time-stamped because the sub-side storage controllers at the remote center have remote-copied data from different points in time.

So it has been suggested that, at a main center, one storage controller (hereinafter called the 'main storage controller') be connected to the rest of the storage controllers (hereinafter called the 'secondary storage controllers'), the main storage controller repeatedly suspends/continues remote copy at a predetermined timing, and the secondary storage controllers also repeatedly suspends/continues remote copy in conjunction with the main storage controller so that data consistency between the main center and the remote center can be ensured at the time of remote copy suspension.

SUMMARY OF THE INVENTION

In a conventional storage system having an asynchronous type remote copy function, if data is copied at regular time intervals from a primary-side storage controller to a sub-side storage controller, separate data transfer from the primary-side storage controller to the sub-side storage controller is not allowed unless the current remote copy cycle is complete. Therefore, in that conventional storage system, if a snapshot is created in the primary-side storage controller during a remote copy cycle, the snapshot cannot be transmitted to the sub-side storage controller speedily.

Accordingly, if it is possible, in a storage system, to transmit a snapshot, which has been created in a primary-side storage controller during a remote copy cycle, to a sub-side storage controller speedily, the functionality of the storage system can be improved and the entire system becomes highly advantageous.

The invention was devised considering the above points and aims to propose a highly advantageous storage system and a snapshot management method.

In order to solve the above problems, the invention provides a storage system, having a first storage controller and a second storage controller, that duplicates write target data sent from a host computer to the first storage controller and stores it in the first storage controller and in the second storage controller. In the storage system, the first storage controller includes: a first storage device that provides a first storage area for storing the write target data sent from the host computer; and a first controller that creates a first snapshot composed of a data image of the first storage area at regular or irregular time intervals and transfers differential data for the created first snapshot to the second storage controller. The second storage controller includes: a second storage device that provides a second storage area for storing the first snapshot obtained based on the differential data; and a second controller that creates, in response to a request sent from the host computer via the first storage controller to create a snapshot in the second storage controller, an externally-accessible second snapshot composed of a data image of the second storage area. When a request to create a snapshot in the second storage controller is sent from the host computer, the first controller in the first storage controller suspends transferring differential data to the second storage controller, creates a new first snapshot, and transfers the differential data for the created first snapshot together with the untransferred differential data for the previous first snapshot, for which the transfer had been suspended, to the second storage controller.

Consequently, with the storage system, it is possible to speedily create in the second storage controller a second snapshot having the same content as the first snapshot created in the first storage controller when the first storage controller receives the request from the host computer to create a snapshot in the second storage controller.

The invention also provides a snapshot management method used in a storage system, the storage system having a first storage controller and a second storage controller and duplicating write target data sent from a host computer to the first storage controller and storing it in the first storage controller and in the second storage controller. The method includes: a first step of creating, at regular or irregular time intervals, a first snapshot composed of a data image of a first storage area for storing the write target data sent from the host computer and transferring differential data for the created first snapshot to the second storage controller; and a second step of creating, in response to a request sent from the host computer via the first storage controller to create a snapshot in the second storage controller, an externally-accessible second snapshot composed of a data image of a second storage area for storing the first snapshot obtained based on the differential data. In the first step, when the request to create a snapshot in the second storage controller is sent from the host computer, transfer of the differential data to the second storage controller is suspended, and a new first snapshot is created, and differential data for the created first snapshot, together with the untransferred differential data for the previous first snapshot, for which transfer had been suspended, are transferred to the second storage controller.

Consequently, with the above snapshot management method, it is possible to speedily create in the second storage controller a second snapshot having the same content as the first snapshot created in the first storage controller when the first storage controller receives the request from the host computer to create a snapshot in the second storage controller.

According to the invention, it is possible to improve the functionality of the storage system and therefore the entire system becomes highly advantageous.

BRIEF DESCRIPTION OF THE DRAWINGS

FIG. 5 is a timing chart explaining a snapshot management method in the storage system;

FIG. 17A is a schematic diagram explaining a plural-snapshots management method in the storage system;

FIG. 17B is another schematic diagram explaining the plural-snapshots management method in the storage system;

FIG. 17C is still another schematic diagram explaining the plural-snapshots management method in the storage system;

DETAILED DESCRIPTION OF THE INVENTION

An embodiment of this invention is described below in detail with reference to the attached drawings.

(1) Structure of Storage System according to Present Embodiment

Figure 1:
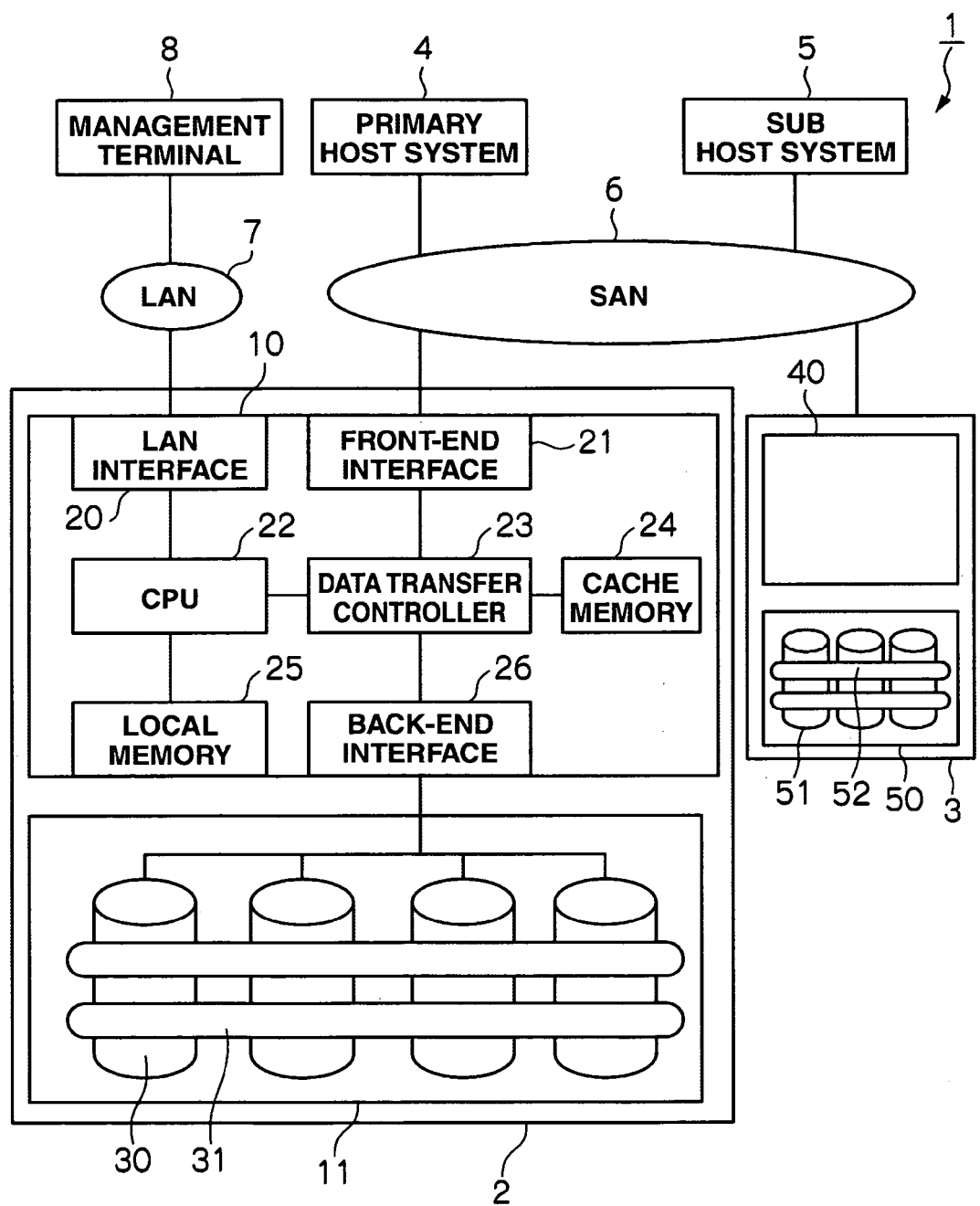
FIG. 1 is a block diagram showing the structure of a storage system according to an embodiment of the invention.

FIG. 1 shows the structure of a storage system 1 according to an embodiment of the invention. The storage system 1 includes a first storage controller 2 and a second storage controller 3. The first storage controller 2, the second storage controller 3, a primary host system 4, and a sub host system 5 are connected to each other via a Storage Area Network (SAN) 6.

The primary host system 4, which is a regular-use host computer, makes requests to the first storage controller 2 to perform I/O processing mainly when the storage system is operating normally. The sub host system 5, which is a standby host system, makes requests to the second storage controller 3 to perform I/O processing mainly when the storage system has trouble; and takes over the processing the primary host system 4 had been performing when the trouble occurred. Examples of the primary host system 4 and the sub host system 5 include personal computers, work stations, and mainframe computers.

The storage system 1 is configured in such a manner that data written in the first storage controller 2 is remote-copied to the second storage controller 3 so that the data is duplicated and stored in both the first storage controller 2 and the second storage controller 3. The second storage controller 3 retains a data image identical to the data image the first storage controller 2 had in the past.

Therefore, even if a failure occurs in the first storage controller 2, the storage system can operate using the second storage controller 3.

With regard to the type of remote copy, the system may use synchronous copy, wherein write completion is reported to the primary host system 4 when data has been written in both the first storage controller 2 and the second storage controller 3; or asynchronous copy, wherein write completion is reported to the primary host system 4 when data has been written in the first storage controller 2, and the data is transferred to the second storage controller 3 at an appropriate time. In the following description, the case where the first storage controller 2 is used as a regular-use primary storage controller and the second storage controller 3 is used as a standby sub storage controller is explained.

The first storage controller 2 is mainly composed of a controller 10 and a memory apparatus 11.

The controller 10 has a Local Area Network (LAN) interface 20, front-end interface 21, CPU 22, data transfer controller 23, cache memory 24, local memory 25, and a back-end interface 26.

The controller 10 is able to control a plurality of disk drives 30, which are arranged in the memory apparatus 11 as described below, based on a RAID defined RAID level (e.g., RAID 0, RAID 1, or RAID 5). In the RAID configuration, the disk drives 30 are managed as one RAID group. A plurality of logical volumes 31, which are the units the primary host system 4 accesses, is set for the RAID group. Each logical volume 31 is assigned a logical unit number (LUN).

The CPU 22 is a processor that controls I/O processing (write access and read access) performed for the disk drives 30 in response to data input/output requests from the primary host system 4.

The local memory 25 stores various micro programs and a volume management table. Details of the programs and the table will be described later.

The cache memory 24 is buffer memory that temporarily stores: write data to be written in the disk drives 30; and read data that has been read from the disk drives 30. The cache memory 24 has a power source backup and is structured as non-volatile memory that can prevent loss of cache data upon a power failure in the first storage controller 2.

The data transfer controller 23 connects the cache memory 24, front-end interface 21, back-end interface 26 and the CPU 22 to one other and controls data transfer between the primary host system 4 and the disk drives 30. When the primary host system 4 requests write access, the data transfer controller 23 writes the relevant write data sent from the primary host system 4 via the front-end interface 21 in the cache memory 24; and then transfers it to the back-end interface 26 to have it asynchronously written in the relevant disk drives 30. Meanwhile, if the primary host system 4 requests read access, the data transfer controller 23 writes the relevant read data it read via the back-end interface 26 from the relevant disk drives 30 in the cache memory 24; and then transfers it to the front-end interface 21.

The front-end interface 21 is a controller that controls an interface between the controller 10 and the primary host system 4 and has a function that receives Fibre-Channel-Protocol-based block access requests from the primary host system 4.

The back-end interface 26 is a controller that controls an interface between the controller 10 and the disk drives 30 and has a function that controls data input/output requests, which are based on a protocol controlling the disk drives 30, to the disk drives 30.

The LAN interface 20 is connected to a LAN 7 and controls transmission and reception of data and control signals to and from a management terminal 8 based on TCP/IP.

The memory apparatus 11 has a plurality of disk drives 30. The disk drives 30 are storage devices such as Fibre Channel (FC) disk drives, Serial Advanced Technology Attachment (SATA) disk drives, Parallel Advanced Technology Attachment (PATA) disk drives, Fibre Attached Technology Adapted (FATA) disk drives, Serial Attached SCSI (SAS) disk drives, and Small Computer System Interface (SCSI) disk drives.

The first storage controller 2 is connected to the management terminal 8 via the LAN 7. The management terminal 8 is a computer system having hardware resources such as a CPU, memory, and a display. Commands to manage the first storage controller 2 are transmitted to the first storage controller 2 by means of a system administrator's input via the management terminal 8. Examples of the management commands include: a command requesting an increase/decrease in the number of storage devices 30 or a change of the RAID configuration; a command setting a communication path between the primary host system 4 and the first storage controller 2; a command installing a micro program from the CPU 22 into the memory 25; and a command checking the operation state of the first storage controller 2 or specifying a defect.

The second storage controller 3 is mainly composed of a controller 40 and a memory apparatus 50.

The detailed configuration of the controller 40 is the same as that of the above-described controller 10. The memory apparatus 50 includes a plurality of disk drives 51. The controller 40 is able to control the disk drives 51 based on a RAID regulated RAID level (e.g., RAID0, RAID1, or RAID 5). In the RAID configuration, the disk drives 51 are managed as one RAID group. A plurality of logical volumes 52, which are the units the sub host system 5 accesses, is set for the RAID group. Each logical volume 52 is assigned a logical unit number (LUN).

Figures 2, 3:
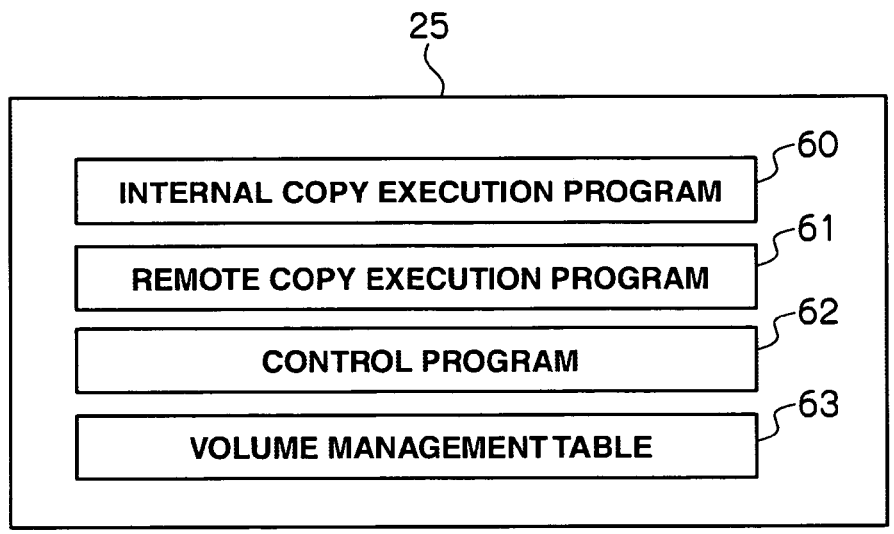
FIG. 2 is a schematic diagram showing an example of information stored in local memory.
FIG. 3 is a schematic diagram showing an example of the structure of a volume management table.

FIG. 2 shows various micro programs and a volume management table.

The local memory 25 stores: an internal copy execution program 60; remote copy execution program 61; control program 62; and a volume management table 63. The internal copy execution program 60 executes internal copy processing and snapshot update processing. The remote copy execution program 61 executes remote copying. The control program 62 controls the internal copy execution program 60 and the remote copy execution program 61. The volume management table 63 stores information about the logical volumes 52.

FIG. 3 shows the structure of the volume management table 63.

The volume management table 63 stores, for each logical volume 31 (hereinafter sometimes abbreviated as 'VOLs'): a VOL-ID for identifying the volume; path information indicating an access path to the volume; the logical volume 31 type (hereinafter called 'VOL type'); a flag indicating whether or not the logical volume 31 is a pool VOL (hereinafter called 'pool VOL flag'); and information for a VOL pair that includes the logical volume 31 (hereinafter called 'pair information'), these elements being stored along with the correspondence relationships established between them. Of the information stored in the volume management table 63, at least one information element (for example, a VOL-ID, VOL type, or a pool VOL flag) can be input from the management terminal 8 or the primary host system 4.

Examples of the VOL types include 'primary,' 'secondary,' and 'pool.' A 'primary' type VOL (hereinafter called 'primary VOL' or 'PVOL') is a copy source VOL in copy processing (e.g., remote copy processing). A 'secondary' type VOL (hereinafter called 'secondary VOL' or 'SVOL') is a copy destination VOL in copy processing. The storage capacity of a secondary VOL is larger than that of a primary VOL. Both the primary and secondary VOLs have defined path information. A 'pool' type VOL (hereinafter called 'pool VOL') has undefined path information. Details of pool VOLs will be described later.

A pool VOL flag indicates whether a logical volume 31 is a pool VOL or not. Specifically speaking, if the pool VOL flag is '1,' the logical volume 31 is a pool VOL, but if it is '0,' the logical volume 31 is not a pool VOL.

Pair information includes, for example, pair partner information and the pair state. The pair partner information includes information about a partner-to-be logical volume 31

(hereinafter called "pair partner VOL") including, for example, an ID of the storage controller the pair partner VOL belongs to, the VOL-ID of the pair partner VOL, and its path information. The pair state includes, for example, 'SMPL,' 'COPY,' 'PAIR,' 'PSUS,' 'SPLIT,' and 'SSWS.'

'SMPL' indicates a pre-pair creation state where a primary-sub relationship has not been established yet.

'COPY' indicates a state where the data in a primary VOL is being copied to a secondary VOL. In the 'COPY' state, the secondary VOL is write-protected.

'PAIR' indicates a state where the data in the primary VOL is being asynchronously-copied to the secondary VOL. In the 'PAIR' state, the secondary VOL is also write-protected.

'PSUS' indicates a state where the asynchronous copy from the primary VOL to the secondary VOL has been stopped. In the 'PSUS' state, the secondary VOL is read-and-write protected.

'SPLIT' indicates a state where the primary VOL and a virtual VOL are logically separated and only differential data, the data concerning the difference between the pre-update primary VOL and the post-update primary VOL, is being copied to the secondary VOL.

'SSWS' indicates a state where reading and writing from and to the secondary VOL are allowed. In the 'SSWS' state, the data in the secondary VOL is restored to previously-confirmed content, and the primary VOL moves into 'PSUS' mode.

By referring to the volume management table 63, the CPU 22 specifies the type for an access target logical volume 31 and obtains its pair information. When a pool VOL is assigned as a virtual VOL, which will be described later, the CPU 22 defines path information for that pool VOL and registers the defined path information in the volume management table 63. The CPU 22 may also delete the path information for a pool VOL that is no longer assigned as a virtual VOL, returning that pool VOL to a non-used state. The CPU 22 can check the state (used/unused) of each pool VOL based on whether or not the path information for that pool VOL is registered in the table.

Figure 4:
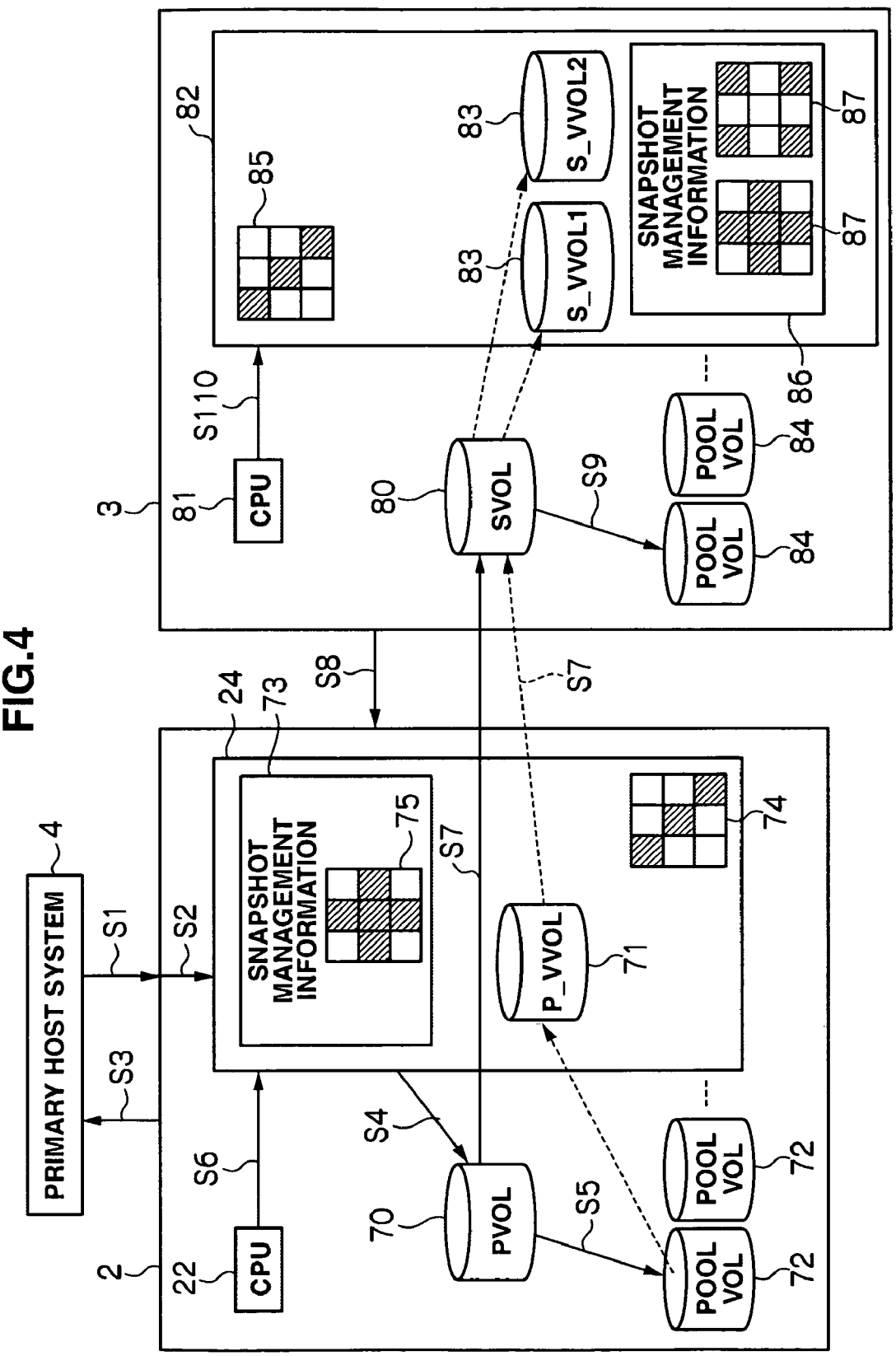
FIG. 4 is a schematic diagram explaining the flow of processing performed in the storage system.

FIG. 4 shows the outline of asynchronous remote copy processing executed by the first storage controller 2.

The first storage controller 2 has the CPU 22, cache memory 24, primary VOL 70, virtual VOL 71, a plurality of pool VOLs 72, snapshot management information 73, and a transfer differential bitmap table 74.

The pool VOLs 72 are logical volumes where, when the pair of the primary VOL 70 and the virtual VOL 71 is split and the data image of the primary VOL 70 is updated after that split, data concerning the difference between the pre-update data and the post-update data is saved.

The virtual VOL 71 is a virtual volume used for restoring the data image of the primary VOL 70 at a certain point in time using the data stored in the primary VOL 70 at a certain point in time and the data saved in the pool VOL 72 from the primary VOL 70 at a certain point in time. The virtual VOL 71 is able to logically retain snapshots of the primary VOL 70. It can be paired with the primary VOL 70 or the secondary volume 80. The present embodiment shows the case where the virtual VOL 71 is formed in a storage area provided by the cache memory 24, however, it may alternatively be formed in a storage area provided by the disk drives 30 (FIG. 1). For ease of explanation, the virtual VOL 71 is sometimes abbreviated as P_VVOL.

The CPU 22 may select one or more pool VOLs 72 (e.g., unused pool VOLs that do not correspond to any virtual VOLs) from among the plural pool VOLs 72 and assign them as virtual VOLs 71. The CPU 22 can increase or decrease the number of pool VOLs 72 assigned as the virtual VOLs 71 depending on the storage resource consumption situation.

The snapshot management information 73 is information for restoring, by using a snapshot, a data image of the primary VOL 70 at a certain point in time. The CPU 22 judges, by referring to the snapshot management information 73, whether the respective pieces of data constituting the data image of the primary VOL 70 at the certain point in time exist in a pool VOL 72 or in the primary VOL 70, obtains them from the relevant volume based on that judgment, and restores that data image in the virtual VOL 71. The snapshot management information 73 includes a differential bitmap table 75 that indicates the data update position in the primary VOL 70.

The transfer differential bitmap table 74 shows the position (in other words, the data update position in the primary VOL 70) of differential data that is to be remote-copied to the secondary VOL 80 when the data in the primary VOL 70 is updated after it is initial-copied to the secondary VOL 80.

The CPU 22 can put the primary VOL 80 and the virtual VOL 71 into the 'COPY' pair state. If data is written in the primary VOL 70 when the primary VOL 70 and the virtual VOL 71 are in the 'COPY' state, the CPU 22 writes the data in the virtual VOL 71 or in the pool VOL 72.

The CPU 22 can also put the primary VOL 70 and the virtual VOL 71 into the 'SPLIT' pair state. If data is written in the primary VOL 70 when they are in the 'SPLIT' pair state, the CPU 22 runs the internal copy program 60 (FIG. 2) to execute internal copy processing and snapshot update processing.

The second storage controller 3 has a CPU 81, cache memory 82, secondary VOL 80, a plurality of virtual VOLs 83, a plurality of pool VOLs 84, snapshot management information 73, and a transfer differential bitmap table 85.

The pool VOLs 84 are logical volumes where, when the pair state of the secondary VOL 80 and a virtual VOL 83 is 'SPLIT' and the data image of the secondary VOL 80 is updated after that split, data concerning the difference between the pre-update data and the post-update data is saved.

The virtual VOLs 83A and 83B are virtual logical volumes used for restoring the data image of the secondary VOL 80 at a certain point in time using the data stored in the secondary VOL 80 at a certain point in time and the data saved in a pool VOL 84 from the secondary VOL 80 at a certain point in time. The virtual VOLs 83A and 83B are able to logically retain snapshots of the secondary VOL 80. The present embodiment shows the case where the virtual VOLs 83A and 83B are formed in a storage area provided by the cache memory 82, however, they may alternatively be formed in a storage area provided by the disk drives 30 (FIG. 1). For ease of explanation, the virtual VOLs 83 are sometimes abbreviated as S_VVOLs.

The snapshot management information 86 is information for restoring, using a snapshot, a data image of the secondary VOL 80 at a certain point in time. The CPU 81 judges, by referring to the snapshot management information 86, whether the respective pieces of data constituting the data image of the secondary VOL 80 at the certain point in time exist in the pool VOL 84 or in the secondary VOL 80, obtains the data from the relevant volume based on the judgment, and restores the data image of the secondary VOL 80 at the certain point in time in the virtual VOL 83. The snapshot management information 86 includes a differential bitmap table 87 indicating a data update position in the secondary VOL 80.

The transfer differential bitmap table 85 shows which part of data in the secondary VOL 80 was updated by the remote copy when the data in the primary VOL 70 is updated after it is initial-copied to the secondary VOL 80.

Details of the internal copy processing, snapshot update processing and the remote copy processing are explained below. The following explanation is based on the premise that the primary VOL 70 and the virtual VOL 71 are in the 'SPLIT' pair state.

When the first storage controller 2 receives a write access request from the primary host system 4 (S1), it stores the relevant write data in the cache memory 24 (S2) and reports write completion to the primary host system 4 (S3).

The CPU 22 reads the write data written in the cache memory 24 and writes it in the primary VOL 70 (S4). Here, the CPU 22 moves the pre-update data (data that has been written in the primary VOL 70 and has not yet been updated (overwritten) with the write data) from the primary VOL 70 to the pool VOL 72 (S5).

When the internal copy is performed when the primary VOL 70 and the virtual VOL 71 are in the 'SPLIT' pair state, the respective pieces of data constituting the data image of the primary VOL 70 at a certain point in time are distributed to the primary VOL 70 and the pool VOL 72.

The CPU 22 then updates the snapshot management information 73 to information necessary to restore the data image of the primary VOL 70 at the time when the pair state of the primary VOL 70 and the virtual VOL 71 is split (hereinafter called the 'split time'), using the data stored in the primary VOL at the split time and the data migrated from the primary VOL 70 to the pool VOL 72 after that split time (S6). By the snapshot update processing, the virtual VOL 71 can logically retain the snapshot of the primary VOL 70.

When the primary VOL 70 and the virtual VOL 71 are in the 'SPLIT' pair state, each time the CPU 22 receives a write access request from the primary host system 4, it repeats the above-described steps S2 to S6.

After a predetermined period of time has passed since the split time, the CPU 22 starts the remote copy execution program 61 (FIG. 2) and executes the remote copy processing. The remote copy execution program 61 merges the differential bitmap table 75 with the transfer differential bitmap table 74. Then, based on the transfer differential bitmap table 74, the remote copy execution program 61 judges whether the respective pieces of data for restoring the data image of the primary VOL 70 at the split time exist in the primary VOL 70 or in the pool VOL 72, obtains them from the relevant volume based on the judgment, and transfers them to the second storage controller 3 (S7). By the remote copy processing, the data image of the primary VOL 70 at the split time is reproduced in the secondary VOL 80.

When the second storage controller 3 receives the respective pieces of data from the first storage controller 2, it reports write completion to the first storage controller 2 (S8).

Thereafter, each time the CPU 81 writes data received from the first storage controller 2 in the secondary VOL 80, it migrates pre-update data (data that has been written in the secondary VOL 80 and has not yet been updated (overwritten) with the write data) from the secondary VOL 80 to the pool VOL 84 (S9).

The CPU 81 then updates the snapshot management information 86 to information necessary to restore the data image of the secondary VOL 80 at the split time, using the data stored in the secondary VOL 80 at the split time and the data migrated from the secondary VOL 80 to the pool VOL 84 after that split time (S10).

Note that the CPU 81 uses the two virtual VOLs 83 alternately. Accordingly, the CPU 81 can clear the differential bitmap table 87 corresponding to one virtual VOL 83 while logically creating a snapshot of the secondary VOL 80 in the other virtual VOL 83. It takes a long time to clear the differential bitmap table 87, so by alternating between the two virtual VOLs 83, it is possible to create a snapshot and, at the same time, clear the differential bitmap table 87, thereby providing high efficiency.

FIG. 5 shows a sequence of asynchronous remote copy processing executed in the first storage controller 2.

Based on a command to perform the asynchronous remote copy processing sent from the primary host system 4 to the first storage controller 2, the asynchronous remote copy begins with an initial copy between the first storage controller 2 and the second storage controller 3, in which all the data in the primary VOL 70 is copied to the secondary VOL 80. After the initial copy is complete, the primary VOL 70 and the virtual VOL 71 are put in the 'SPLIT' pair state in the first storage controller 2.

Time t0 in FIG. 5 indicates the split time when the primary VOL 70 and the virtual VOL 71 are put in the 'SPLIT' pair state. The data image of the primary VOL 70 at the time t0 is called 'image T0.' The image T0 is the data image where a data block A is stored in a first block area of the primary VOL 70. At the time t0, the pool VOL 72 is not storing any pre-update data. The snapshot management information 73 is information for restoring the image T0.

When the data block A in the first block area of the primary VOL 70 is overwritten with a data block B at the time t1 (i.e., during the 'SPLIT' pair state period), the data image of the primary VOL 70 changes from the image T0 to the image T1. At this point in time, the internal copy execution program 60 writes the data block A (pre-update data) in the primary VOL 70 in the pool VOL 72; and updates the snapshot management information 73 to information indicating that the first block area in the primary VOL 70 has been updated and that the data block A (pre-update data) that had existed in the first block area is now stored in the pool VOL 72.

Also, at the time t1, the control program 62 (FIG. 2) commands the remote copy execution program 61 (FIG. 2) to perform the remote copy processing. The remote copy execution program 61 checks, by referring to the transfer differential bitmap table 74, that the data block A constituting the image T0 exists in the pool VOL 72, obtains the data block A from the pool VOL 72, and transmits it to the second storage controller 3.

Time t2 is the time when the remote copy processing is complete. Consequently, the image T0 that had been existing in the primary VOL 70 at the time t0 is replicated in the secondary VOL 80.

Then, when a data block C is written in a second block area in the primary VOL 70 at the time t2 (i.e., during the 'SPLIT' pair state period), the data image of the primary VOL 70 changes from the image T1 to the image T2. At this time, the internal copy execution program 60 (FIG. 2) updates the snapshot management information 73 to information indicating that the second block area in the primary VOL 70 has been updated.

Then, after the time t2 and before the time t3, if the data block C in the second block area is overwritten with a data block D, the data image of the primary VOL 70 changes from the image T2 to the image T3 (i.e., to the data image where the data block B exists in the first block area and the data block D exists in the second block area). At this time, the internal copy execution program 60 migrates the data block C (pre-update data) from the primary VOL 70 to the pool VOL 72; and updates the snapshot management information 73 to information indicating that the second block area in the primary VOL 70 has been updated and the data block C that had existed in the second block area is now stored in the pool VOL 72.

Then, before the virtual VOL 71 is further updated, the primary VOL 70 and the virtual VOL 71 are again put into the 'SPLIT' pair state at the time t3.

At the time t3, i.e., when the primary VOL 70 and the virtual VOL 71 are in the 'SPLIT' pair state, the CPU 22 deletes all the pre-update data stored in the pool VOL 72 for the purpose of logically retaining the image T3 of the primary VOL 70 at the time t3 in the virtual VOL 71.

The CPU 22 also updates the snapshot management information 73 from the information for restoring the image T0 to the information for restoring the image T3. More specifically, for example, because the virtual VOL 71 has not yet been further updated at the time of t3, the CPU 22 updates the snapshot management information 73 to information indicating that the virtual VOL 71 has not been further updated yet.

When the data block D in the second block area of the primary VOL 70 is overwritten with a data block E at the time t4, the data image of the primary VOL 70 changes from the image T3 to the image T4. At this time, the internal copy execution program 60 writes the data block D (pre-update data) in the primary VOL 70 in the pool VOL 72 and updates the snapshot management information 73 to information indicating that the second block area of the primary VOL 70 has been updated and that the data block D that had existed in the second block area has been migrated to the pool VOL 72.

The remote copy processing is also performed at the time t4. The remote copy execution program 61 (FIG. 2) knows, by referring to the transfer differential bitmap table 74, that the first block area of the primary VOL 70 has not been updated and so the data block constituting the image T3 exists in the primary VOL 70, and that the second block area of the primary VOL 70 has been updated and the data block D also constituting the image T3 exists in the pool VOL 72. The remote copy execution program 61 obtains the data block B from the primary VOL 70 and the data block D from the pool VOL 72, and transfers them to the second storage controller 3.

Time t5 is the time when the remote copy processing is complete. Consequently, the image T0 in the secondary VOL 80 is updated to the image T3, which is the image of the primary VOL 70 at the time of t3. In other words, the data block A in the first block area of the secondary VOL 80 is overwritten with the data block B and the data in the second block area of the secondary VOL 80 is overwritten with the data block D.

After that, the second storage controller 3 maintains the image T3 until it receives data that constitutes an image T6 of the primary VOL 70 at the split time t6.

Thereafter, the processing executed from t3 to t5 is repeated at regular time intervals.

Specifically speaking, in the first storage controller 2, the primary VOL 70 and the virtual VOL 71 are put in the 'SPLIT' pair state at 15 second intervals.

The remote copy processing is performed during the time when they are in the 'SPLIT' pair state before they are again put in the next 'SPLIT' pair state (in other words, in parallel with the internal copy processing and the snapshot update processing). After the remote copy processing is complete, when the primary VOL 70 and the virtual VOL 71 are again put in the 'SPLIT' pair state, the pre-update data is deleted from the pool VOL 72. By repeating these steps, the data images (in the example of FIG. 5, the image T0 at the time t0, image T3 at the time t3, and the image T6 at the time t6) of the primary VOL 70 at the split times are logically retained in the virtual VOL 71 and also copied to the secondary VOL 80.

Figure 6:
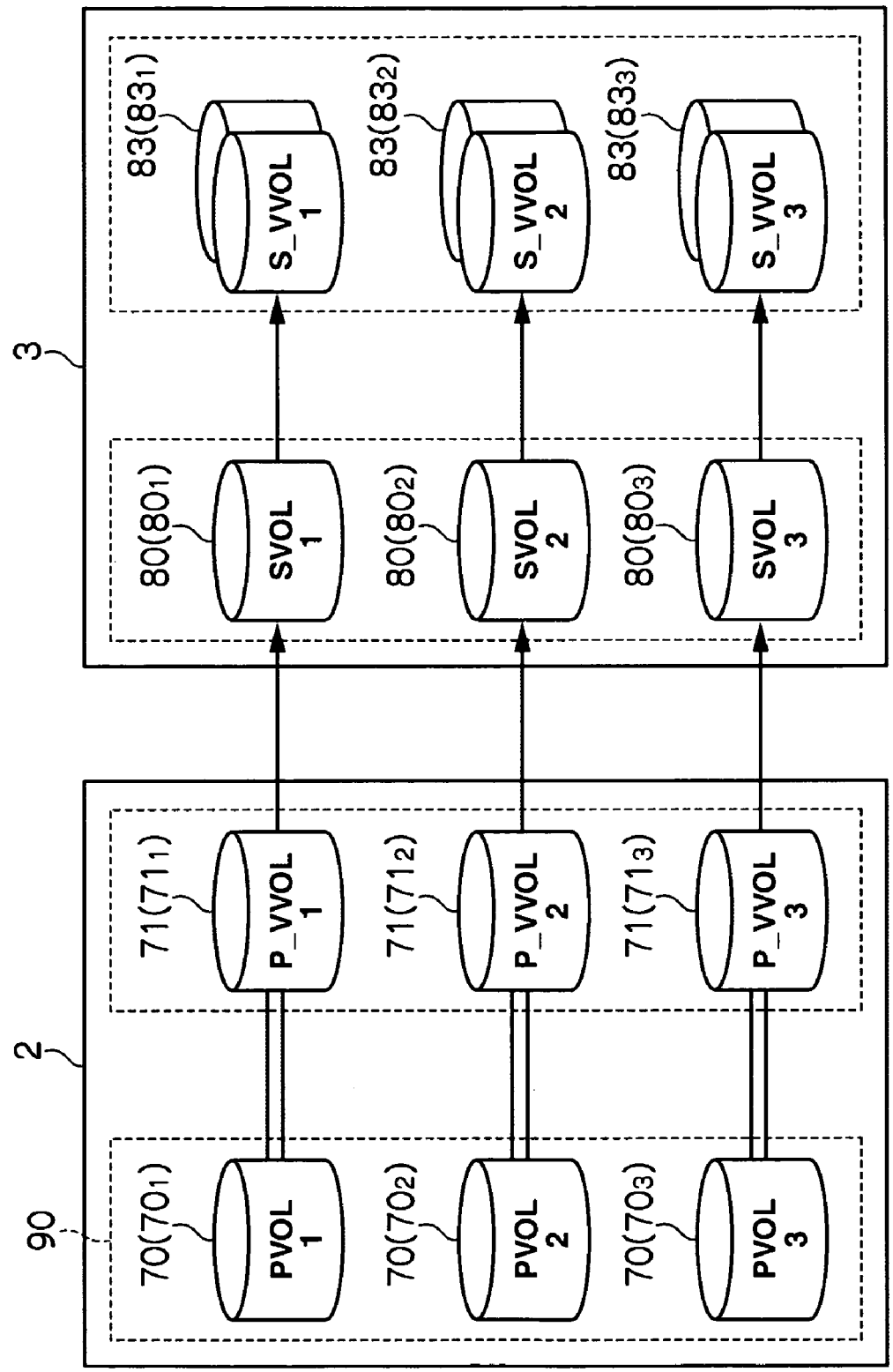
FIG. 6 is a schematic diagram explaining contency groups.

Note that, in the storage system 1, the above-described remote copy processing is performed not only for a single primary VOL 70 but also for a contency group 90 (FIG. 6).

The contency group 90 refers to a primary VOL group consisting of a plurality of primary VOLs 70 ($70_1$ to $70_3$), each storing relevant data, for example, a primary VOL $70_1$ storing data for a database, a primary VOL $70_2$ storing log data for the database, and a primary VOL $70_3$ storing control information for the database, as shown in FIG. 6.

Accordingly, in the storage system 1, it is also possible to form virtual VOLs $71_1$ to $71_3$ corresponding to the respective primary VOLs $70_1$ to $70_3$ in the contency group 90 in the first storage controller 2 and also to form secondary VOL $80_1$ to $80_3$ and virtual VOL $83_1$ to $83_3$ in the second storage controller 3 corresponding to the primary VOL $70_1$ to $70_3$. Moreover, in the storage system 1, when the primary host system 4 commands that the remote copy processing be performed for the contency group 90, it is possible to copy, substantially at the same timing, the data images of the respective primary VOLs in the contency group 90 to the corresponding secondary VOLs $80_1$ to $80_3$ in the second storage controller 3 via the corresponding virtual VOL $71_1$ to $71_3$ in the first storage controller 2, according to the above-described sequence.

Figure 7:
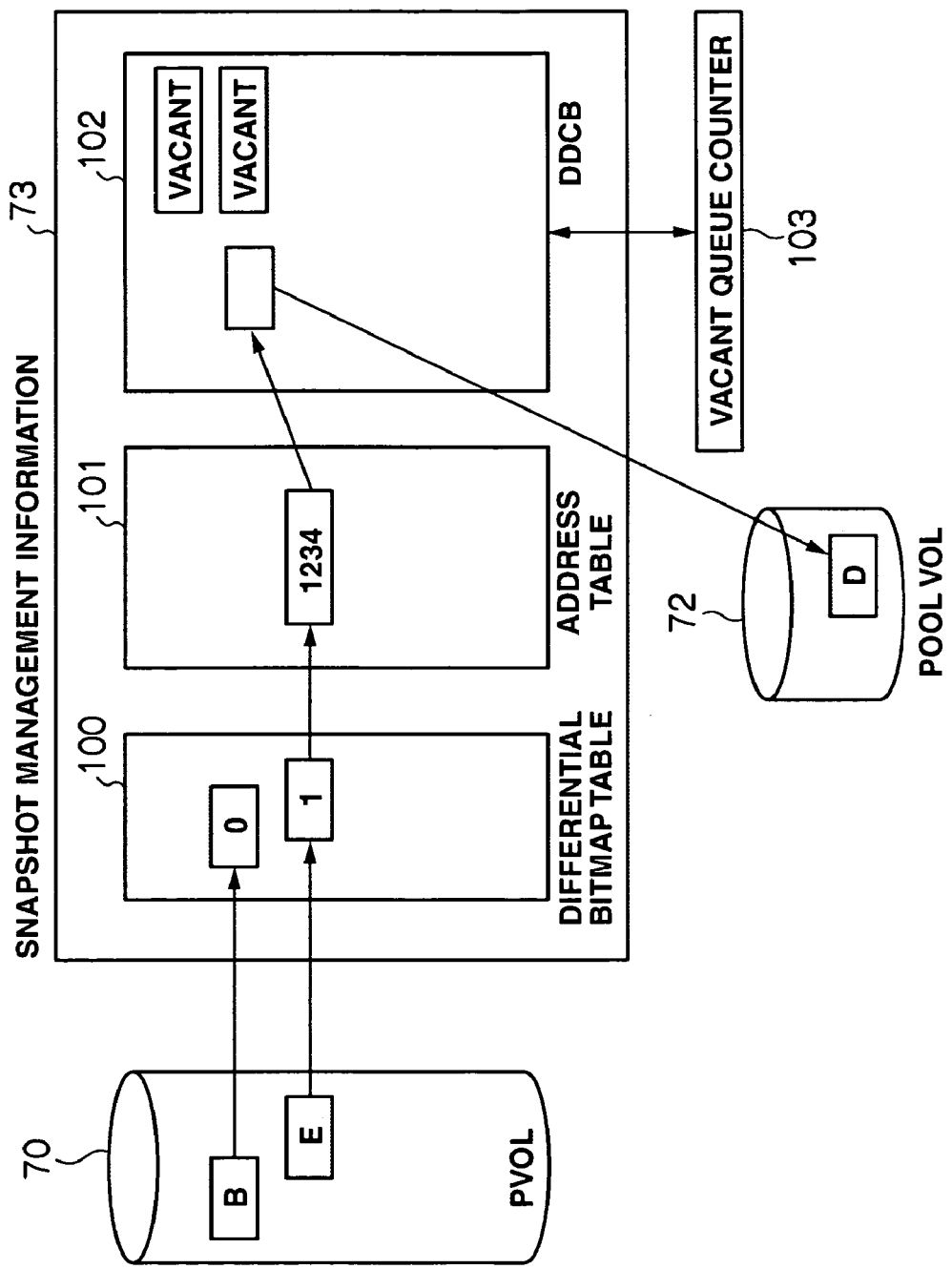
FIG. 7 is a schematic diagram explaining the entire flow of processing including split-state starting and remote copy execution.

FIG. 7 shows the outline of the snapshot update processing according to the present embodiment. More specifically, FIG. 7 shows the state where the data image of the primary VOL 70 changes from the image T3 to the image T4, and the image T3 is logically retained in the virtual VOL 71.

The snapshot management information 73 includes a differential bitmap table 100, an address table 101, and a differential data control block (Differential Data Control Block: DDCB) 102.

The differential bitmap table 100 has a plurality of bits corresponding to the respective block areas (1 block area is 64 K bytes, for example) in the primary VOL 70. For example, if the data image changes from the image T3 to the image T4, the first block area in the primary VOL 70 is not updated as shown in FIG. 7, therefore, the bit corresponding to the first block area remains '0' whereas, because the data block C in the second block area is overwritten with the data block D, the bit corresponding to the second block area is updated from '0' to '1.'

The address table 101 has address areas corresponding to the respective block areas in the primary VOL 70. If there is pre-update data corresponding to a block area, the address area corresponding to the block area is entered with the address of the address area in the differential data control block 102.

The differential data control block 102 has, for example, management areas corresponding to the respective block areas in the pool VOL 72. Each management area records information about which level snapshot the pre-update data stored in a block-area-corresponding place in the pool VOL 72 is for. The CPU 22 can obtain plural-level pre-update data by searching the management areas.

Note that the unused areas in the differential data control block 102 are managed as vacant queues. The vacant queues are managed by a vacant queue counter 103.

With the above configuration, a data image of the primary VOL 70 at the time of snapshot creation can be copied to the virtual VOL 71. Moreover, information about which level the pre-update data in the virtual VOL 71 is on is managed by the differential data control block 102.

(2) External Snapshot Creation Function

Figure 8:
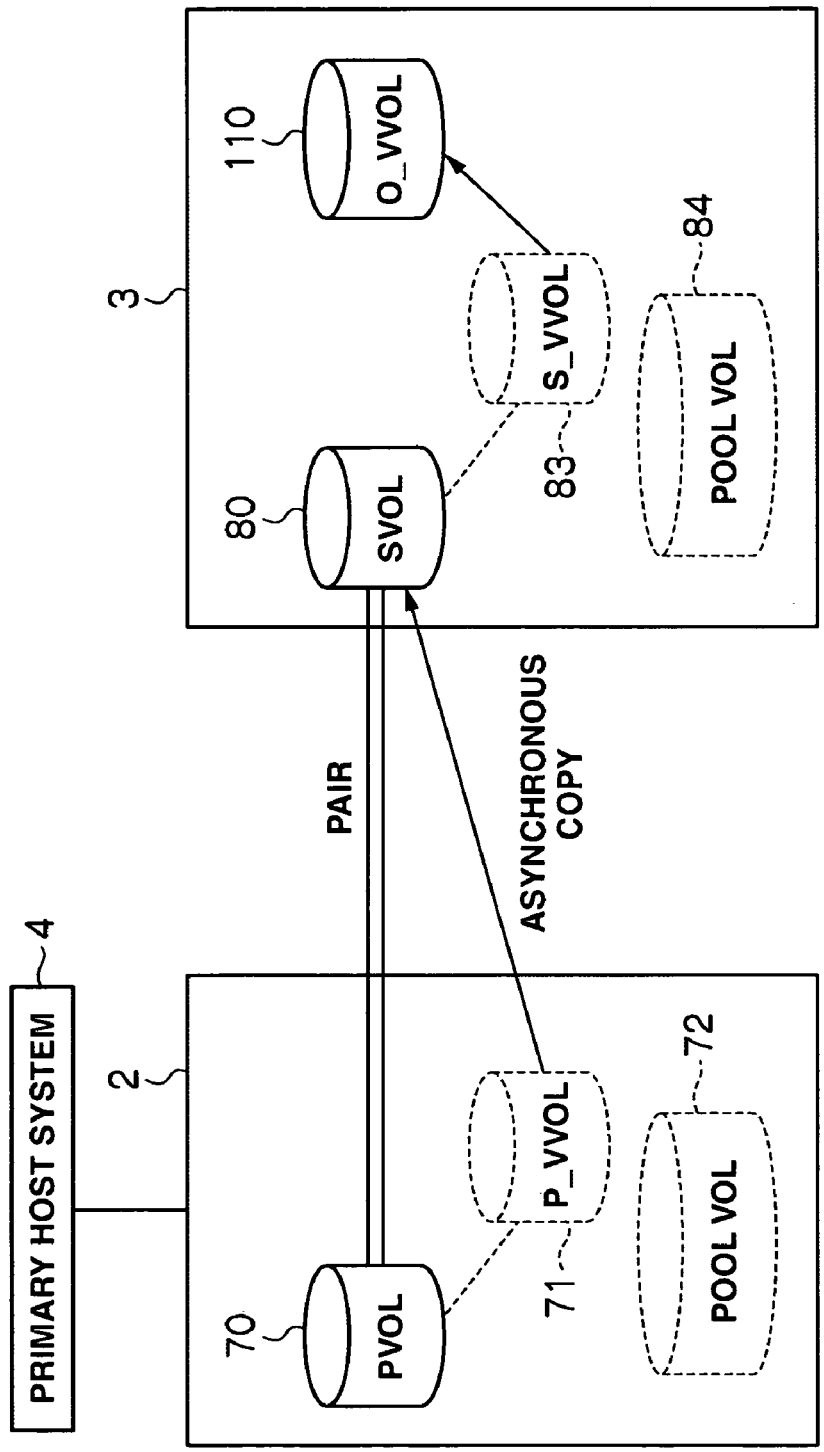
FIG. 8 is a schematic diagram explaining the outline of an external snapshot creation function of the storage system.

An external snapshot creation function employed in the storage system 1 is explained below. As shown in FIG. 8, one of the features of the storage system 1 according to the present embodiment is that, when the primary host system 4 gives an external snapshot creation request to the first storage controllers 2, an externally-accessible snapshot (hereinafter called 'external snapshot') can be speedily created in the second storage controller 3, the snapshot having the same content as the snapshot of the primary VOL 70 created in the first storage controller 2 when given the request.

An external snapshot is different from the data images (hereinafter called 'internal snapshots') of the secondary VOL 80 that are created in an externally-unrecognizable manner at regular time intervals and stored in the virtual VOL 83 as backups in case of trouble in the secondary VOL 80, in that only one external snapshot is created in an accessible manner as a backup for the primary VOL 70 when the first storage controller 2 receives an external snapshot creation request.

Note that when an external snapshot creation request is given to a designated contency group, external snapshots having the same content as the snapshots of the respective primary VOLs 70 ($70_1$ to $70_3$; FIG. 6) belonging to the contency group are created in the second storage controller 3.

The actual content of the processing to create only one external snapshot corresponding to one primary VOL 70 in the second storage controller 3, and that of the processing to create plural external snapshots corresponding to the respective primary VOLs 70 constituting the contency group 90 in the second storage controller 3 is the same, with only the number of external snapshots to create being different. In the following explanation, a case where one external snapshot is created corresponding to one primary VOL 70 in the second storage controller 3 is described.

Figure 9:
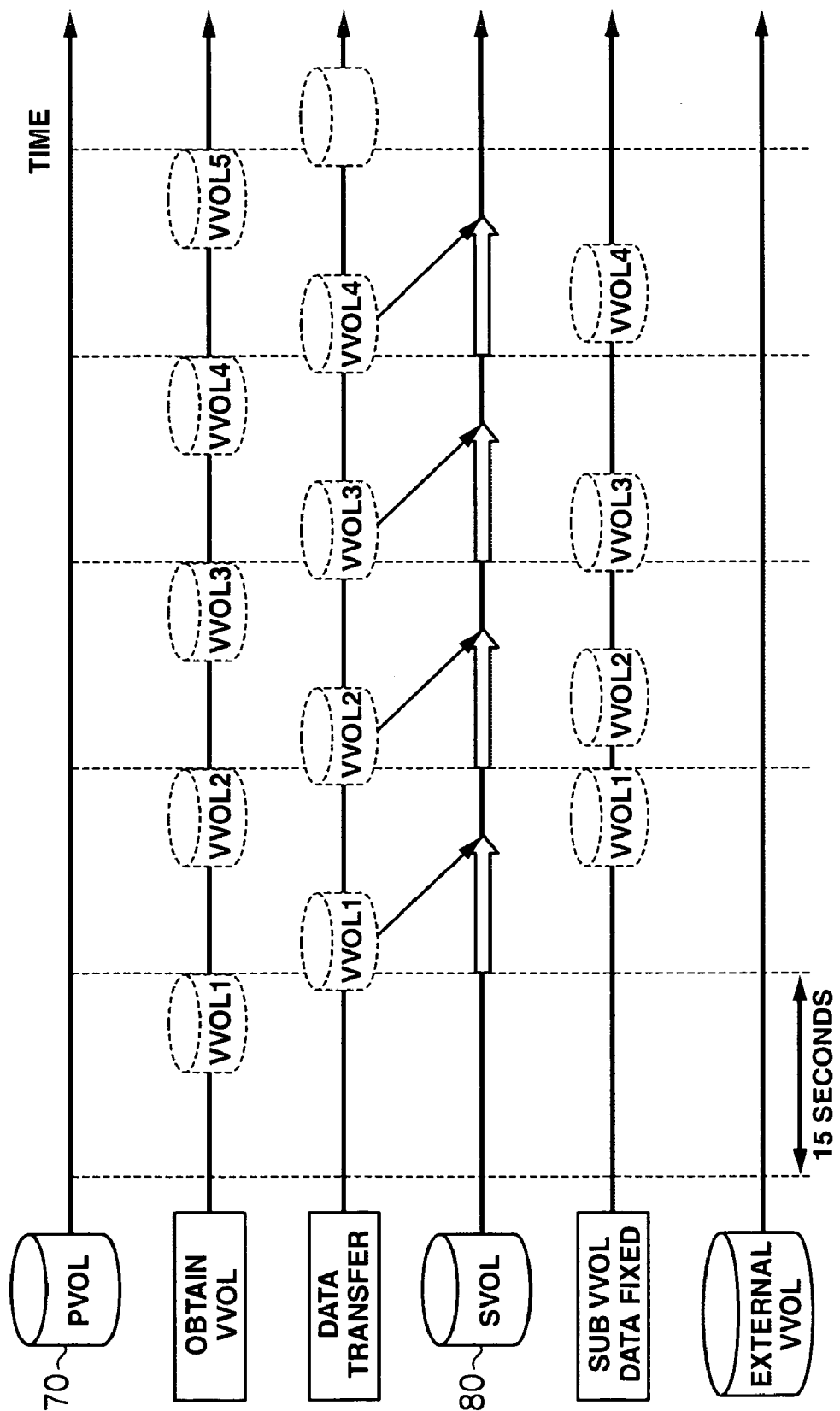
FIG. 9 is a timing chart explaining a remote copy function of the storage system.

In the storage system 1, the primary VOL 70 and the virtual VOL 71 are put in the 'SPLIT' pair state at regular time intervals in the first storage controller 2 and the remote copy between the primary VOL and the secondary VOL is performed so that the data of the primary VOL is distant-copied to the secondary VOL by performing the remote copy processing between the first and second storage controllers 2 and 3, as shown in FIG. 9.

Figure 10:
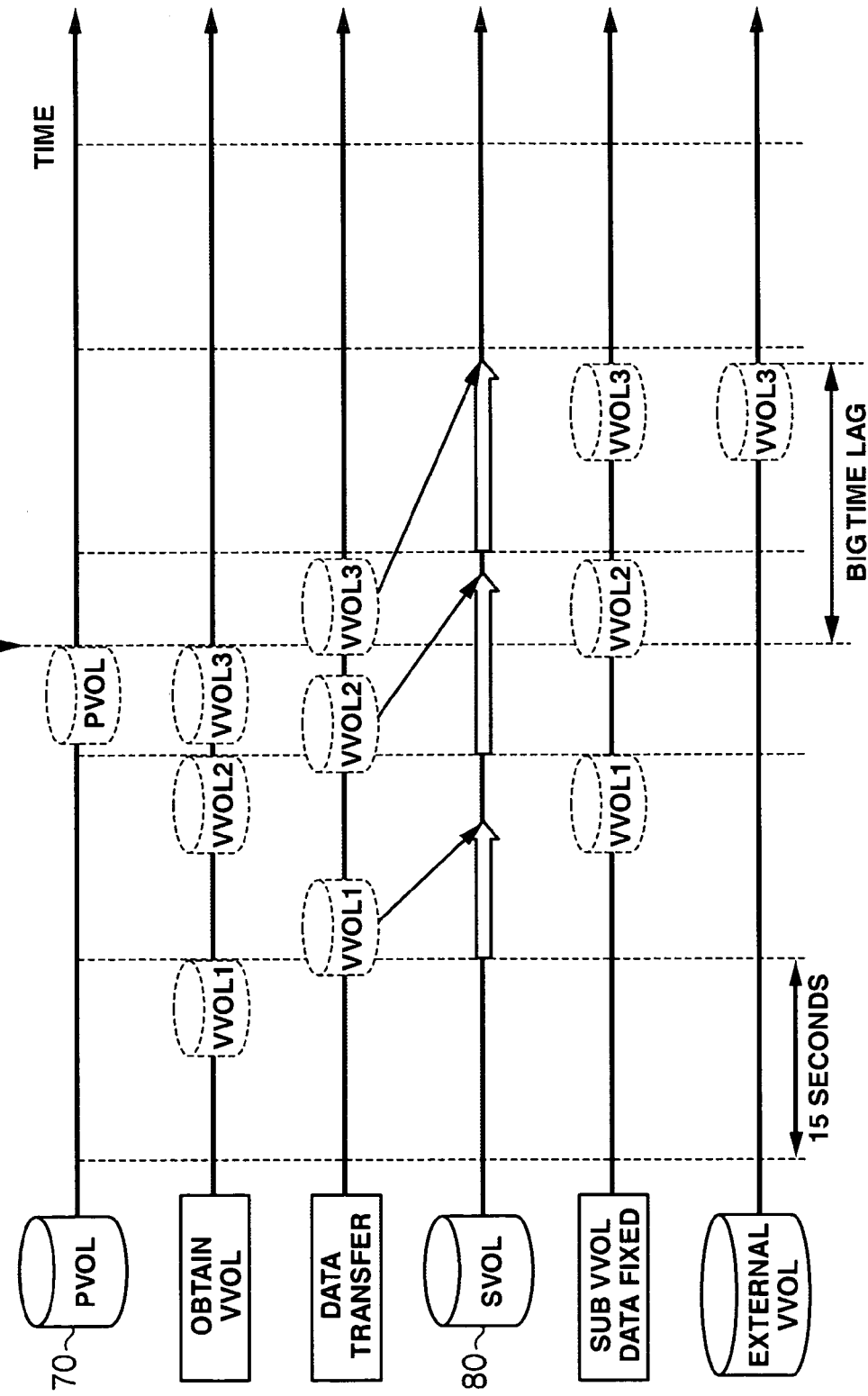
FIG. 10 is a timing chart explaining problems of the remote copy function of the storage system.
Figure 11:
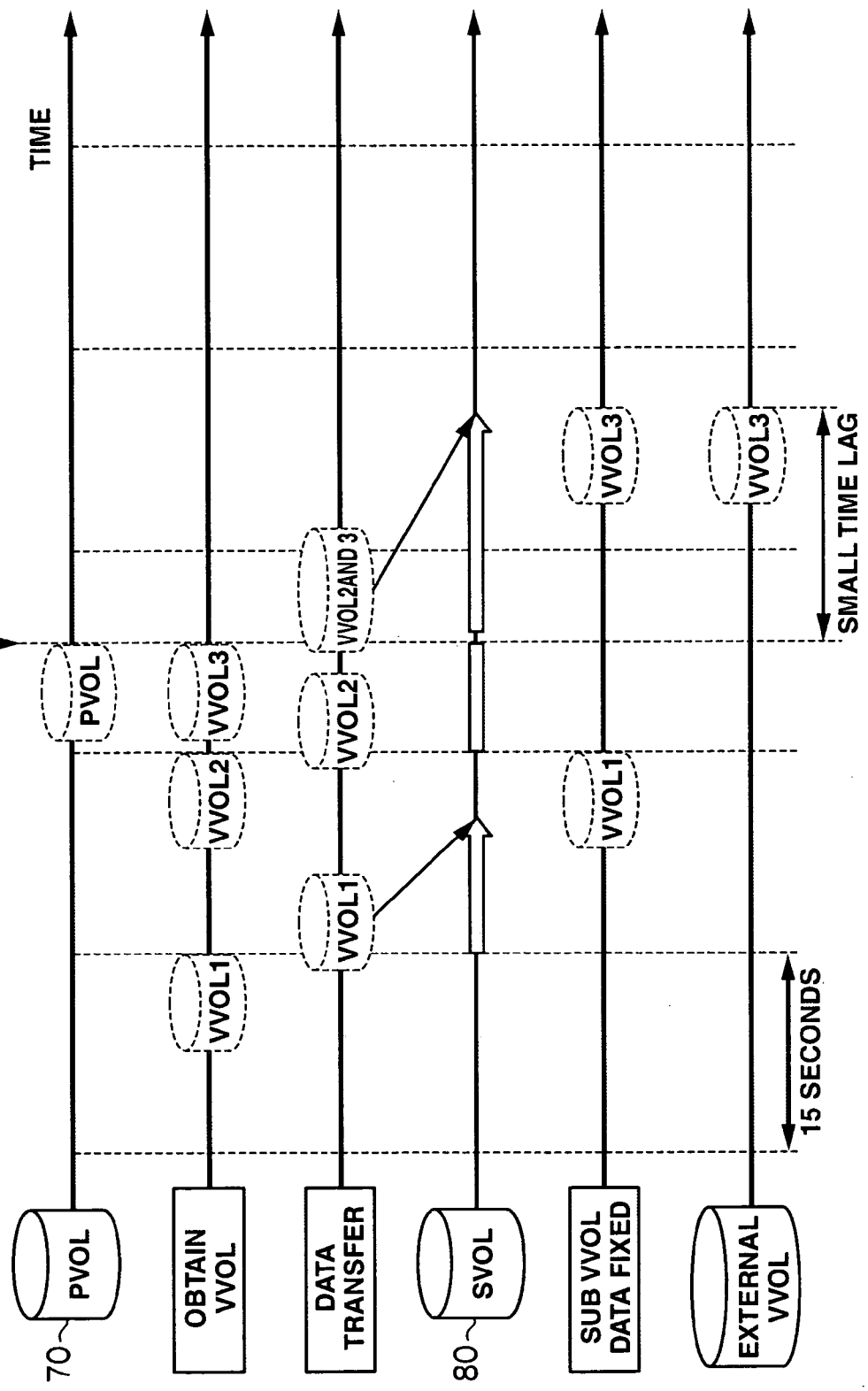
FIG. 11 is a timing chart explaining the outline of the external snapshot creation function of the storage system.

Therefore, even if an external snapshot creation request is sent from the primary host system 4 to the first storage controller 2 in the middle of remote copy processing in one cycle, differential data for restoring a snapshot of the primary VOL 70 created at the time when the first storage controller 2 received the external snapshot creation request cannot be transferred from the first storage controller 2 to the second storage controller 3 until the remote copy processing in that cycle is complete and the data is fixed in the secondary VOL 80 (i.e., a snapshot is created in the virtual VOL), as shown in FIG. 10. Accordingly, unless measures are taken to solve this problem, it is impossible to speedily create, in the second storage controller 3, an external snapshot having the same content as the snapshot of the primary VOL 70 created when the first storage controller 1 received the external snapshot creation request.

Thereupon, in order to create an external snapshot speedily, the storage system 1 is configured in such a manner that, when an external snapshot creation request is sent from the primary host system 4 during the remote copy processing in a cycle, the remote copy processing in that cycle is suspended; and the untransferred differential data in that cycle and differential data for restoring the data image of the primary VOL 70 created when the first storage controller 2 received the external snapshot creation request are transmitted together from the first storage controller 2 to the second storage controller 3.

Figure 12:
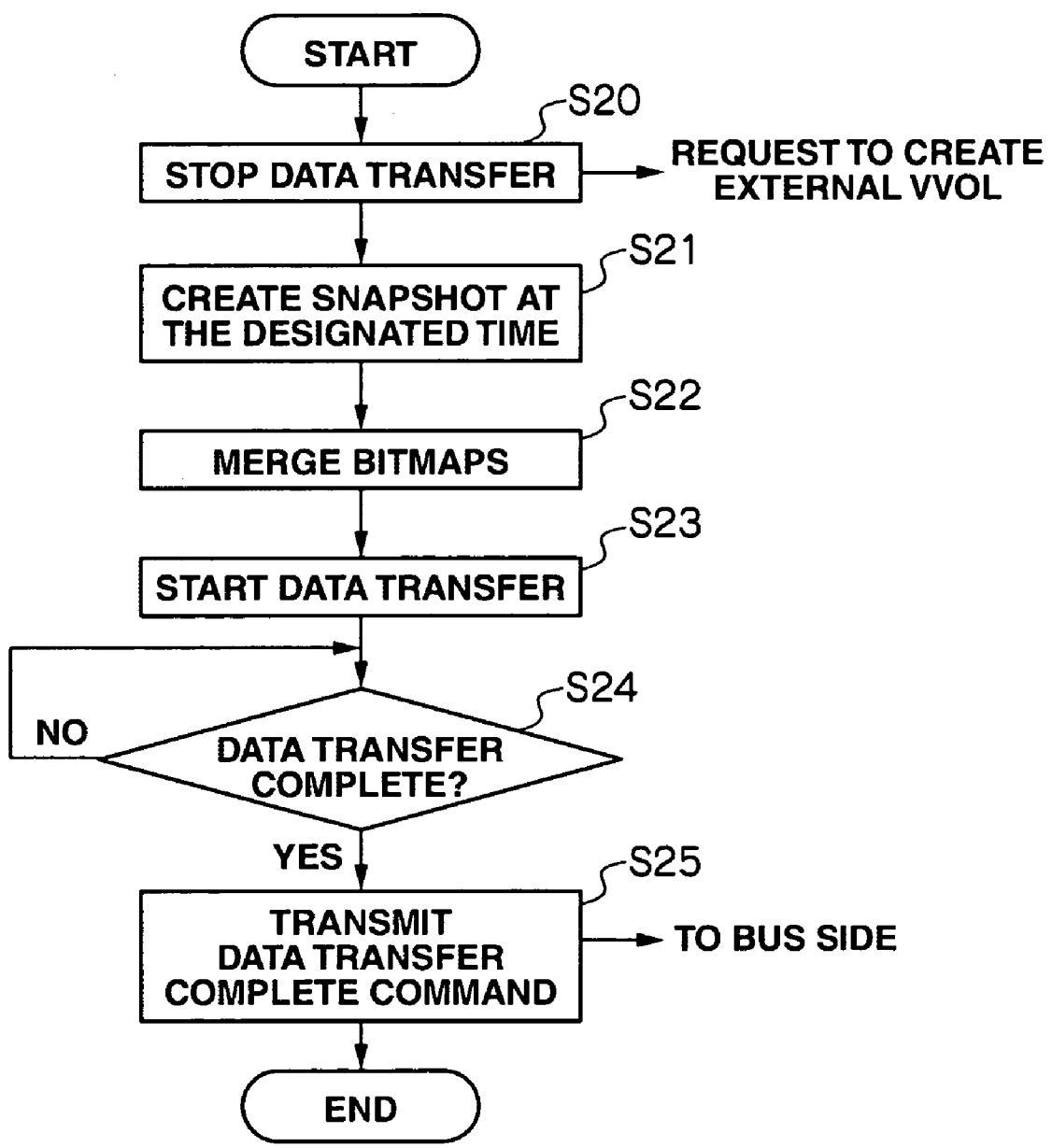
FIG. 12 is a flowchart showing a routine for primary-side external snapshot creation processing.

FIG. 12 is a flowchart indicating the content of the above-described external snapshot creation processing performed by the CPU 22 (FIG. 1) in the first storage controller 2. Based on the remote copy execution program 61 (FIG. 2), the CPU 22 performs the processing to create, in the second storage controller 3, an external snapshot having the same content as the snapshot of the primary VOL 70 created when the first storage controller 1 received the external snapshot creation request, in accordance with the primary-side external snapshot creation processing routine shown in FIG. 12.

Specifically speaking, when an external snapshot creation request is given from the primary host system 4, the CPU 22 suspends the currently ongoing remote copy processing (data transfer processing) and transmits a command (hereinafter called the 'external snapshot creation request command') to create an external snapshot to the second storage controller 3 (S20). In parallel with that, the CPU 22 also reflects the data image of the primary VOL 70 at that point in time in the virtual VOL 71, thereby creating a snapshot of the primary VOL 70 at that point in time (S21).

Figure 13:
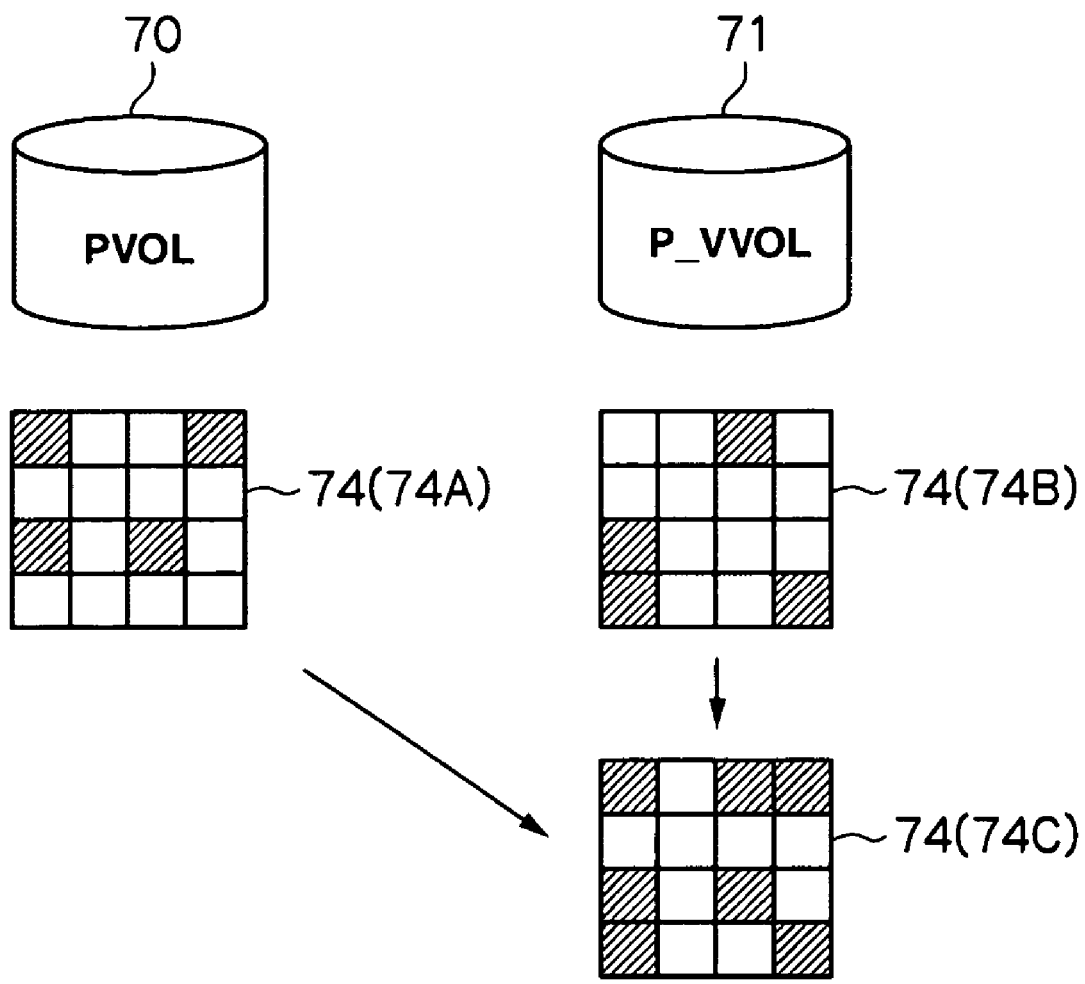
FIG. 13 is a schematic diagram explaining merger of transfer differential bitmap tables.

Subsequently, as shown in FIG. 13, the CPU 22 merges (combines) a transfer differential bitmap table 74A for managing the transfer of differential data for the snapshot created in the step S21 with a transfer differential bitmap table 74B for managing the untransferred differential data for the snapshot for which the remote copy processing has been suspended in the step S20; and thereby creates a bitmap table (hereinafter called 'merged bitmap table') 74 G(S22).

Then, based on the merged bitmap table 74C, the CPU 22 starts the remote copy processing to transmit, from the first storage controller 2 to the second storage controller 3, the differential data necessary to restore the snapshot of the primary VOL 70 at the time of receipt of the external snapshot creation request (S23→S24→S23).

When the above remote copy processing is complete (S24; Yes), the CPU 22 transmits a predetermined data transfer completion notice to the second storage controller 3; puts the virtual VOL 71 in the first storage controller 2 and the secondary VOL 80 in the second storage controller 3 into the 'PSUS' pair state (S25); and terminates the processing.

Figure 14:
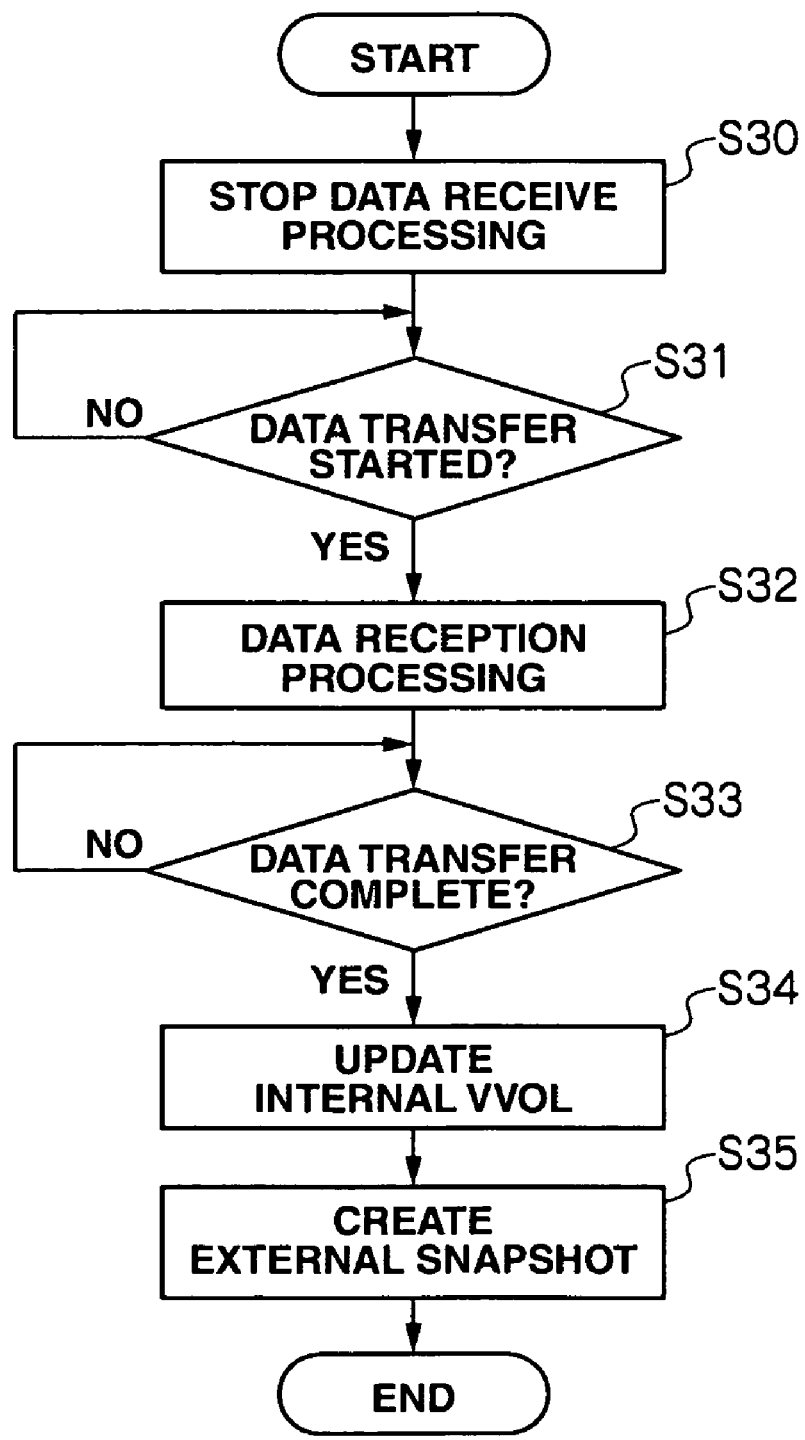
FIG. 14 is a flowchart showing a routine for sub-side external snapshot creation processing.

FIG. 14 is a flowchart showing the content of the external snapshot creation processing performed by the CPU 81 (FIG. 4) in the second storage controller 3. Based on the remote copy execution program 61, the CPU 81 creates an external snapshot having the same content as the snapshot of the primary VOL 70 created at the time of receipt of the external snapshot creation request, in accordance with the sub-side external snapshot creation processing routine shown in FIG. 14.

Specifically speaking, when the CPU 81 receives the external snapshot creation request command from the first storage controller 2 (see step S20 in FIG. 12), it suspends the currently ongoing remote copy processing (S30), and waits until the first storage controller 2 starts transferring the differential data based on the merged bitmap table 74C described above in relation to FIG. 13 (S31).

When the transfer of the differential data starts, the CPU 81 executes receipt processing for the differential data (S32→S33→S32). When this receipt processing is complete (S33; Yes), the CPU 81 updates the virtual VOL 83 to reflect the data image of the secondary VOL 80 at that time in the virtual VOL 83 (S34).

When the CPU 81 receives a data transfer completion notice from the first storage controller 2 (see step S25 in FIG. 12), it creates an externally-accessible virtual VOL 110, i.e., an external snapshot, in which the data image of the virtual VOL 83 at that time is reflected (S35). The created external snapshot has the same data content as the snapshot of the primary VOL 70 created when the first storage controller 2 received the external snapshot creation request. The CPU 81 then completes the processing.

(3) External Snapshot Creation Time Display Function

When creating, as above, an external snapshot having the same content as a snapshot of the primary VOL 70 created when the first storage controller 2 is given an external snapshot creation request 2, it takes time to transfer differential data from the first storage controller 2 to the second storage controller 3; therefore, there is a time lag between the time when the first storage controller 2 receives the external snapshot creation request and the time when an external snapshot is created in the second storage controller 3.

Accordingly, it is necessary to devise an idea to help a user to specify a target external snapshot from among the other external snapshots created in the second storage controller 3 when storing an external snapshot having the same content as an snapshot of the primary VOL 70 created at a certain point in time in a tape type memory medium or the like.

In the storage system 1, when the remote copy between the virtual VOL 71 in the first storage controller 2 and the secondary VOL 80 in the second storage controller 3 is complete, the virtual VOL 71 and the secondary VOL 80 move from the 'PAIR' pair state to the 'PSUS' pair state, so the creation timing of an external snapshot can be detected by monitoring from the primary host system 4 the pair state using an existing command (e.g., the 'pairdisplay' command).

However, even if the creation timing of an external snapshot is detected by the above method, there is no guarantee that the created external snapshot is definitely the target external snapshot, so a method that allows the user to specify the target external snapshot with certainty has been sought after.

So the storage system 1 is configured in such a manner that the second storage controller 3 is notified by the first storage controller 2 of the time when the primary host system 4 issued an external snapshot creation request to the first storage controller 2; and the storage controller 3 keeps a record of the time in association with the external snapshot created at that time, so that the user can specify that external snapshot created in the second storage controller 3 based on that recorded time.

Actually, in the storage system 1, an external snapshot creation request has a field for storing letter string data (hereinafter called 'letter-string-storing field'). When issuing an external snapshot creation request to the first storage controller, 2, the primary host system 4 stores, as time information, letter string data indicating the issue time in the letter-string-storing field.

When the CPU 22 in the first storage controller 2 receives an external snapshot creation request, it extracts the letter string data from the letter-string-storing field in the request and stores it in itself; and, when transmitting a data transfer completion notice to the second storage controller 3 at step S25 in the primary-side external snapshot creation processing routine described above in relation to FIG. 12, stores the letter string data in a predetermined position in the notice and transmits it to the second storage controller 3.

When receiving the data transfer completion notice, the CPU 81 in the second storage controller 3 reads the letter string data from the predetermined position in the notice, and stores it along with the correspondence relationship established with the external snapshot created at that time.

Also, when the user inputs a command to display information for the external snapshot through the management terminal connected to the second storage controller 3, the CPU 81 transmits the letter string data to the management terminal so that the letter string based on the letter string data is displayed on the management terminal.

As explained above, with the storage system 1, the user can easily know, by the letter string displayed on the management terminal, which point-in-time data image of the primary VOL 70 the external snapshot created in the second storage controller 3 is for.

Meanwhile, in the storage system 1, by using, for example, the method disclosed in Japanese Patent Laid-Open Publication No. 2002-49517, each time a snapshot is created by reflecting a data image of the primary VOL 70 in the virtual VOL 71, the CPU 22 in the first storage controller 2 assigns a sequence number to the snapshot and manages the sequence numbers. The CPU 22 manages the sequence numbers for each contency group.

The CPU 22 judges that the remote copy processing is complete when transmission of differential data for a snapshot to the second storage controller 3 is complete. The CPU 22 then notifies, upon request, the primary host system 4 of the completion time of the remote copy processing.

Accordingly, in the storage system 1, with the function as explained above, the user of the primary host system 4 connected to the first storage controller 2 can roughly know the time when a creation-requested external snapshot is created in the second storage controller 3.

(4) Plural Snapshot Management Method in Storage System (4-1) Plural Snapshot Management by Common Bit In the storage system 1, the data in the secondary VOL 80 is not fixed while executing the remote copy processing; therefore, it is impossible to create an external snapshot based on the secondary VOL 80.

Whereas, after the completion of the remote copy processing, an internal snapshot, i.e., a data image, of the secondary VOL 80 after the completion of the remote copy processing, is retained in the virtual VOL 83. The internal snapshot retained in the virtual VOL 83 is in the state where its data is fixed.

Accordingly, the CPU 81 in the second storage controller 3 creates an external snapshot based on the internal snapshot retained in the virtual VOL 83 in step S35 in the sub-side external snapshot creation processing routine described above in relation to FIG. 14. Consequently, as seen from the secondary VOL 80, the virtual VOL 83 retaining the internal snapshot is a 'child' and the virtual VOL 110 retaining the snapshot is a 'grandchild.'

Conventional storage controllers having the snapshot function can create plural snapshots but only support the hierarchical relationship of 'parent' and 'child' where plural sub volumes are created for one primary volume.

Figure 15:
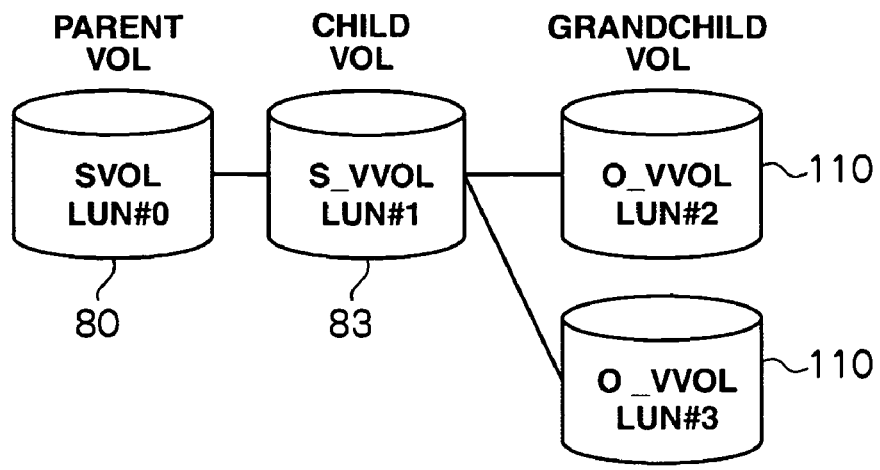
FIG. 15 is a schematic diagram explaining the hierarchy of virtual VOLs.

On the contrary, in the storage system 1 in the present embodiment, as shown in FIG. 15, it is possible to create a plurality of 'child' level virtual VOLs 83 (internal snapshots) based on the secondary VOL 80 in the second storage controller 3; and also to create 'grandchild' level virtual VOLs 110 (external snapshots) based on the 'child' level virtual VOLs 83 (internal snapshots). Moreover, it is also possible to further create virtual VOLs 110 (external snapshots) on levels lower than the 'grandchild' level based on the existing virtual VOLs 110 (external snapshots). Therefore, a new snapshot management method is required to manage the differences between the secondary VOL 80 and the virtual VOLs 110 (external snapshots) on plural levels.

So in the storage system 1, the second storage controller 3 stores, as a part of the snapshot management information 86 in the local memory 82 (FIG. 4), a hierarchical management bitmap table 121 for each block in the secondary VOL 80, the storage positions of the hierarchical management bitmap tables 121 being managed by a primary VOL address table 120.

Moreover, in the storage system 1, while the information about whether there is a difference between the data content of the secondary VOL 80 and the snapshots retained in the virtual VOLs 83 and 110 on the various levels is managed using the hierarchical bitmap tables 121, when a new virtual VOL 110 is created, the differences among the virtual VOLs 83 and 110 are collectively managed by introducing a common bit in each hierarchical management bitmap table 121, the common bit used for the group of virtual VOLs 83 and 110 having a cascade relationship.

Figure 16:
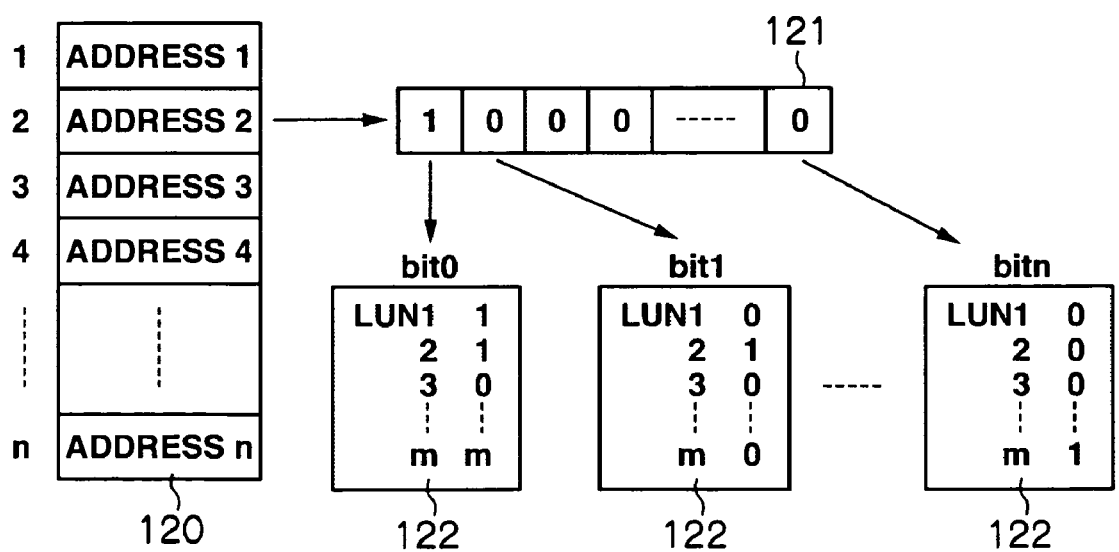
FIG. 16 is a schematic diagram explaining a hierarchical management bitmap table.

In fact, as is clear in FIG. 16, each hierarchical management bitmap table 121 is composed of a plurality of bits. Each time the CPU 81 in the second storage controller 3 creates a new virtual VOL 83 or 110 in the second storage controller 3 for storing an internal snapshot or an external snapshot, it assigns an unused bit in each hierarchical management bitmap table 121 (a bit that has not been assigned to any virtual VOL 83 or 110) as a bit dedicated to that virtual VOL 83 or 110 (hereinafter called 'dedicated bit'). In addition, the CPU 81 assigns, as a common bit, an unused bit in each hierarchical management bitmap table 121 to each group consisting of virtual VOLs 83 and 110 that have newly entered into a cascade relationship upon creation of a new virtual VOL 83 or 110.

For example, as shown in FIG. 17A, if there is only one 'child' level virtual VOL 83 (LUN#1) in the second storage controller 3, the CPU 81 assigns a unused bit in each hierarchical management bitmap table 121 (the leftmost bit in the example of FIG. 17A) to the virtual VOL 83 as a dedicated bit. When a 'grandchild' level virtual VOL 110 (LUN#2) is created having a cascade relationship with that virtual VOL 83 as shown in FIG. 17B, it assigns another unused bit (the third bit from left in the example of FIG. 17B) to the 'grandchild' level virtual VOL 110 as its dedicated bit, and further assigns still another unused bit (the leftmost bit in the example of FIG. 17B) to the group, generated upon the creation of the 'grandchild' level virtual VOL 110 and consisting of the 'child' level virtual VOL 83 (LUN#1) and the 'grandchild' level virtual VOL 110 (LUN#2) having the cascade relationship, as a common bit.

Furthermore, when a 'great-grandchild' level virtual VOL 110 (LUN#5) is created to be cascaded to the 'grandchild' level virtual VOL 110 (LUN#2) as shown in FIG. 17B to FIG. 17C, the CPU 81 assigns another unused bit to the 'great-grandchild' level virtual VOL 110 as a dedicated bit, and also assigns unused bits to each of the group consisting of the cascaded 'child' level virtual VOL 83 (LUN#1), the 'grandchild' level virtual VOL 110 (LUN#2), and the 'great-grandchild' level virtual VOL 110 (LUN#3); and the group consisting of the cascaded 'grandchild' level virtual VOL 110 (LUN#2) and the 'great-grandchild' level virtual VOL 110 (LUN#5), as common bits.

In the above case, the CPU 81 performs the processing to assign a common bit to each group consisting of virtual VOLs 83 and 110, so as to effectively use the data in the original hierarchical management bitmap tables 121 so that the number of changes in the hierarchical management bitmap table 121 becomes fewer even when another common bit is needed for another newly-created external snapshot.

For example, when the 'grandchild' level virtual VOL 110 (LUN#2) having an external snapshot is newly created as shown in FIG. 17A to FIG. 17B, the CPU 81 changes the bit that has been assigned as a dedicated bit to the 'child' level virtual VOL 83 (LUN#1) to a common bit for the 'child' level virtual VOL 83 and the 'grandchild' level virtual VOL (LUN#2), and separately from that bit, also assigns unused bits to the 'child' level virtual VOL 83 and the 'grandchild' level virtual VOL 110 as their dedicated bits.

Moreover, when the 'great-grandchild' level virtual VOL 110 (LUN#5) for retaining an external snapshot is created as shown in FIG. 17B to FIG. 17C, the CPU 81 changes the bit that has been assigned as a common bit for the 'child' level virtual VOL 83 (LUN#1) and the 'grandchild' level virtual VOL 110 (LUN#2) to a common bit for the 'child' level virtual VOL 83, 'grandchild' level virtual VOL 110, and the 'great-grandchild' level virtual VOL 110; also changes the bit that has been assigned as the dedicated bit to the 'grandchild' level virtual VOL 110 to a common bit for the 'grandchild' level virtual VOL 110 and the 'great-grandchild' level virtual VOL 110; and, separately from those bits, assigns unused bits to the 'grandchild' level virtual VOL 110 and the 'great-grandchild' level virtual VOL 110 as their dedicated bits.

If there is a common bit, among the common bits assigned to the various level virtual VOLs 83 and 110, that can be set to '1,' that common bit is set to '1' in preference to the dedicated bits.

For example, there are cases where, when the 'grandchild' level virtual VOL 110 (LUN#2) having a new external snapshot is created as shown in FIG. 17A to FIG. 17B, the common bit for the 'child' level virtual VOL 83 (LUN#1) and the 'grandchild' level virtual VOL 110 (LUN#2) and the dedicated bits for the 'child' level virtual VOL 83 and the 'grandchild' virtual VOL 110 may all be set to '1.' So in that case, the CPU 81 sets the common bit, not the dedicated bits assigned to the 'child' level virtual VOL 83 and the 'grandchild' level virtual VOL 110, to '1.'

Furthermore, there are also some cases where, when a 'great-grandchild' level virtual VOL 110 (LUN#5) is created as shown in FIG. 17B to FIG. 17C, the common bit for the 'child' level virtual VOL 83 (LUN#1), the 'grandchild' level virtual VOL 110 (LUN#2) and the 'great-grandchild' level virtual VOL 110 (LUN#5) and their own dedicated bits may all be set to '1.' So the CPU 81 sets the common bit, not the dedicated bits, to '1.'

As described above, in the storage system 1, because a common bit is set to '1' in preference to a dedicated bit in the above cases, it is possible to decrease the number of bits to be changed in each hierarchical management bitmap table 121 when creating a new virtual VOL 83 or 110 (internal snapshot or external snapshot), thereby allowing easy and speedy execution of the processing to create the virtual VOL 83 or 110 (internal snapshot or external snapshot).

Note that the above-described common bit creation and assignment processing is to facilitate and speed up the processing to create new virtual VOLs 83 and 110; therefore, it is performed only when creating the new virtual VOLs 83 and 110. Accordingly, when data is written in the secondary VOL 80 or in any virtual VOL 83 or 110 after that processing, even if the CPU 81 can set a common bit to '1,' the CPU 81 sets a dedicated bit to '1' in preference to the common bit.

In the storage system 1, information about which bit in a hierarchical management bitmap table is assigned to which virtual VOL 83 or 110 is managed by a bit-management bitmap table 122 as shown in FIG. 16.

A bit-management bitmap table 122 consists of a plurality of bits and is provided for each bit in a hierarchical management bitmap table 121.

Beginning with a first bit (i.e., the top bit in the bit-management bitmap table 122 shown in FIG. 16), all the bits in the bit-management bitmap table 122 each correspond to the logical units in increasing order of LUN, including the LUNs of logical units that have not been created yet.

When assigning a bit in a hierarchical management bitmap table 121 as a common bit or a dedicated bit, the CPU 81 in the second storage controller 3 sets, in the bit-management bitmap table 122 corresponding to that bit, the bit corresponding to the LUN of the assignment target logical unit to '1' and the other bits to '0.'

For example, in the example of FIG. 17B, the second bit in the hierarchical management bitmap table 121 is assigned to the 'child' level virtual VOL 83, therefore, the CPU 81 sets, in the bit-management bitmap table 122 corresponding to that bit, the bit corresponding to the LUN ('#1' in the example of FIG. 17B) of the 'child' level virtual VOL 83 to '1' and the other bits to '0.'

Furthermore, in the example of FIG. 17B, because the leftmost bit in the hierarchical management bitmap table 121 is assigned as a common bit for the 'child' level virtual VOL 83 and the 'grandchild' level virtual VOL 110, the CPU 81 sets, in the bit-management bitmap table 122 corresponding to that bit, the bits corresponding to the LUNs ('#1' and '#2' in the example of FIG. 17B) of the 'child' and 'grandchild' level logical volumes to '1' and the other bits to '0.'

Each time a virtual VOL 83 or 110 is created to store an internal snapshot or an external snapshot and each hierarchical bitmap table 121 needs to be updated, the CPU 81 updates the relevant bit-management bitmap tables 122 as necessary and changes, as appropriate, correspondence relationships between the bits in the hierarchical management bitmap tables 121 and the virtual VOLs 83 and 110.

Thus, in the storage system 1, information about which bit in each hierarchical bitmap table 121 is assigned to which virtual VOL 83 or 110 is managed based on the bit-management bitmap tables 122, allowing easy setting and changing of the assignment of all the bits in the hierarchical management bitmap tables 121.

(4-2) Common Bit Deletion Processing

In the above-described method using common bits, the number of common bits required increases as the number of created virtual VOLs 83 and 110 increases, and therefore, the method requires much more memory resources than a method that does not use common bits. Accordingly, if no measure is taken to control the number of the common bits, the memory resources (the local memory 25 (FIG. 1)) for storing the hierarchical management bitmap tables 121 are compressed.

Figure 18:
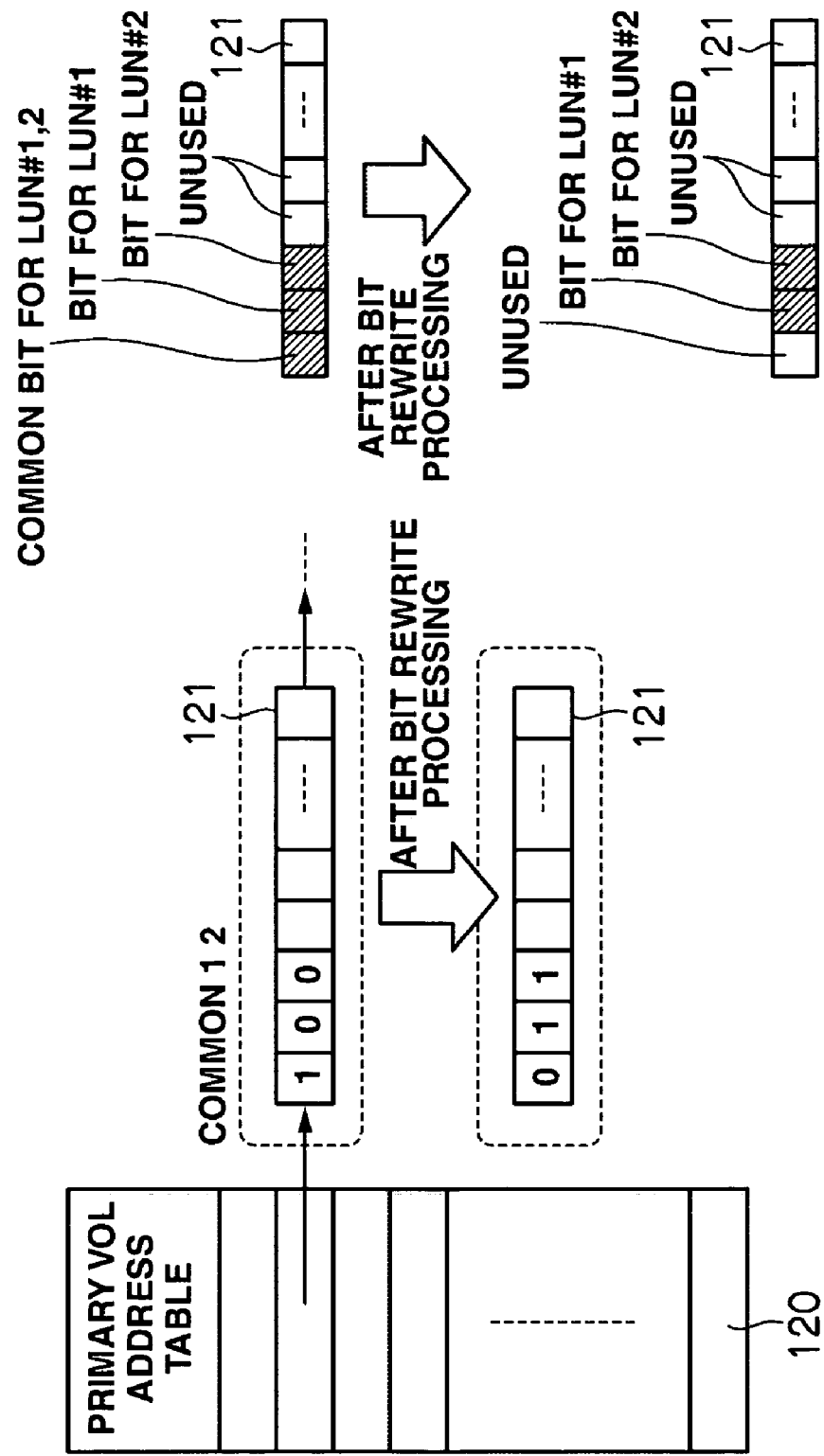
FIG. 18 is a schematic diagram explaining common bit deletion processing.

So in the storage system 1, when a predetermined period of time has passed after the creation of a new virtual VOL 83 or 110, the CPU 81 in the second storage controller 3 checks whether each hierarchical management bitmap table 121 includes a common bit, as shown in FIG. 18, and if any common bit is set to '0,' the CPU 81 deletes it immediately, but if the common bit is set to '1,' it rewrites it to a corresponding dedicated bit via background processing, and then performs processing to delete the common bit.

For example, when a 'grandchild' level virtual VOL 110 (LUN#2) for storing a new external snapshot is created as shown in FIG. 17A to FIG. 17B, a common bit used in common between the 'grandchild' level virtual VOL 110 and the relevant 'child' level virtual VOL 83 is set to '1' as explained above. So the CPU 81 then changes the dedicated bits respectively assigned to the 'child' level virtual VOL 83 and the 'grandchild' level virtual VOL 110 to '1' and deletes the common bit via background processing.

Also, when a 'great-grandchild' level virtual VOL 110 (LUN#5) is created as shown in FIG. 17B to FIG. 17C, a common bit for the 'great-grandchild' level virtual VOL 110 and the relevant 'child' and 'grandchild' level virtual VOLs 83 and 110 is set to '1.' Thereupon, the CPU 81 changes each of the dedicated bits assigned to the 'child,' 'grandchild,' and 'great-grandchild' virtual VOLs 83 and 110 to '1' and then deletes the common bit via background processing.

In the storage system 1, by deleting common bits as above, it is possible to prevent unnecessary use of bits in the hierarchical management bitmap tables 121 and wasting of memory resources.

(5) Cycle Update Time Adjusting Function and Transfer Amount Adjusting Function

In the storage system 1, if there is only one virtual VOL 71 in the first storage controller 2, a snapshot of the secondary VOL 80 cannot be created until the content of the virtual VOL 71 is reflected in a secondary VOL 80 in the second storage controller 3 and the content of the secondary VOL 80 is then reflected in a virtual VOL 83 and the content of the virtual VOL 83 is fixed.

Consequently, when the amount of write data sent from the primary host system 4 increases, the amount of differential data to be transferred from the first storage controller 2 to the second storage controller 3 also increases; accordingly, it temporarily takes a long time to fix the content of the virtual VOL 83 in the second storage controller 3 and the amount of data that may be lost in case of failure increases.

Figure 19:
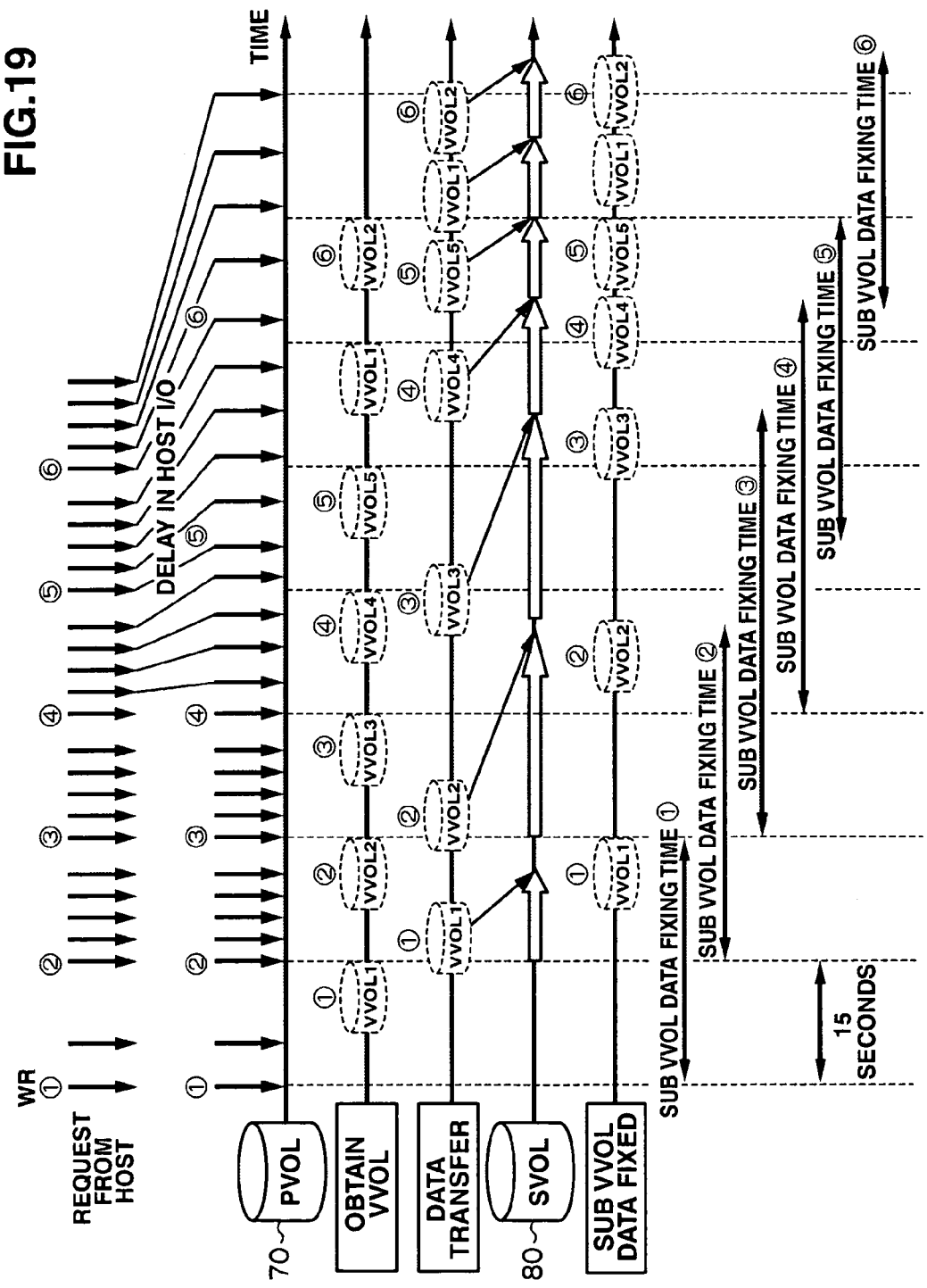
FIG. 19 is a timing chart explaining a cycle update time adjusting function and a transfer amount adjusting function.

So in the storage system 1, a plurality of virtual VOLs 71 is provided in the first storage controller 2, and the virtual VOLs 71 are used in a cycle sequentially. In addition, as shown in FIG. 19, when the number of write requests from the primary host system 4 increases and the data cannot be fully transferred to the second storage controller 3 in one remote transfer cycle and therefore plural virtual VOLs 71 have untransferred data in their virtual VOLs 71, the write acceptance is limited in such a manner that, for example, a write request from the primary host system 4 is accepted only once every few times.

Moreover, in the storage system 1, the user can trigger, via the primary host system 4, data transfer from the first storage controller 2 to the second storage controller 3 separately from the normal cycles, making it possible to reduce the amount of differential data to be transferred in one data transfer cycle from the first storage controller 2 to the second storage controller 3 and to reduce the amount of data loss in case of failure.

(6) Effects of Present Embodiment

As described so far, the storage system 1 is configured in such a manner that, when the first storage controller 2 receives a request to create an external snapshot in the second storage controller 3, it suspends the current cycle of differential data transfer to the second storage controller 3; creates a snapshot of the primary VOL 70 at that point in time; and transfers the differential data for the snapshot together with the untransferred differential data in that cycle to the second storage controller 3.

Accordingly, with the storage system 1, it is possible to speedily create, in the second storage controller 3, a snapshot having the same content as the snapshot created in the first storage controller 1 when the first storage controller 2 receives an external snapshot creation request from the primary host system 4. As a result, the functionality of the storage system 1 can be improved and the entire system becomes highly advantageous.

(7) Other Embodiments

The above embodiment was explained for the case where the controller 10 in the first storage controller 2 that creates a snapshot consisting of a data image of a primary VOL 70 (first storage area) at regular or irregular intervals and transfers differential data for the created snapshot (first snapshot) to the second storage controller 3; and the controller 40 in the second storage controller 3 that creates, in response to a request to create a snapshot in the second storage controller 3 sent from the primary host system 4 via the first storage controller 2, an externally-accessible snapshot (first snapshot) consisting of a data image of a secondary VOL 80 (second storage area), are configured as shown in FIG. 1. However, the invention is not limited to that case and can have various configurations.

The invention can be applied to a storage system composed of a plurality of storage controllers having the so-called snapshot and remote copy functions.

What is claimed is:

1. A storage system comprising:
 a first storage controller; and
 a second storage controller,
 wherein the first storage controller comprises:
 a first storage device that provides a first storage area for storing data sent from a host computer;
 a first controller that creates a first snapshot composed of a data image of the first storage area at regular or irregular time intervals;
 a pool volume that stores differential data migrated from the first storage device; and
 a virtual volume used for restoring a data image of the first storage area at a certain point in time using the data stored in the first storage area at the certain point in time and the differential data stored in the pool volume at the certain point in time,
 wherein the pool volume corresponds to the virtual volume,
 wherein the first controller determines whether respective nieces of data constituting the data image of the first storage area at the certain point in time exist in the first storage area or in the pool volume, obtains the respective pieces of data from the first storage area or the pool volume based on the determination, transfers the respective pieces of data obtained from the first storage area to the second controller, and transfers the respective nieces of data obtained from the pool volume to the second controller via the virtual volume,
 wherein the second storage controller comprises:
 a second storage device that provides a second storage area for storing the respective pieces of data transferred by the first controller; and
 a second controller that creates an externally-accessible second snapshot composed of a data image of the second storage area, in response to a request sent from the host computer via the first storage controller to create an external snapshot in the second storage controller,
 wherein when the request to create the external snapshot in the second storage controller is sent from the host computer, the first controller in the first storage controller suspends transferring the differential data to the second storage controller, creates a new first snapshot, and transfers the differential data for the new first snapshot together with untransferred differential data for the previous first snapshot, for which the transfer has been suspended, to the second storage controller, and
 wherein when the request to create the external snapshot in the second storage controller is sent from the host computer, the first controller in the first storage controller creates a third bitmap by combining a first bitmap for managing the transfer of the differential data for the new first snapshot created when the first storage controller received the snapshot request, and a second bitmap for managing the untransferred differential data for the previous first snapshot for which transferring has been suspended, and transmits, based on the third bitmap, the differential data for the new first snapshot created at the time of receipt of the snapshot request together with the untransferred differential data for the previous first snapshot for which the transfer has been suspended, to the second storage controller.

2. The storage system according to claim 1,
 wherein the second controller in the second storage controller creates a third snapshot composed of a data image of the second storage area based on the first snapshot stored in the second storage area, and creates the above-referenced second snapshot based on that third snapshot.

3. The storage system according to claim 1,
 wherein the second controller in the second storage controller creates a new second snapshot based on the existing second snapshot in response to a request to create a snapshot.

4. The storage system according to claim 3,
 wherein the second controller in the second storage controller has management information composed of a plurality of bits corresponding to predetermined units in the second storage area, and manages information about whether there is a difference between the data content of the second storage area and the created second snapshot, based on the value of a bit assigned to the second snapshot in the relevant management information, and
 wherein when a new second snapshot is created based on the existing second snapshot, the second controller assigns one of the bits included in the management information as a common bit that is used in common by the existing second snapshot and the newly-created second snapshot, and manages, using the common bit, information about whether there is any difference between the data content of the second storage area, the existing second snapshot, and the newly-created second snapshot.

5. The storage system according to claim 1,
 wherein when a new second snapshot is created, the second controller in the second storage controller assigns one of the bits in the management information as a dedicated bit for the new second snapshot, and
 wherein after the new second snapshot is created, the second controller rewrites, at an appropriate time, the information for the common bit to information for a corresponding dedicated bit via background processing.

6. The storage system according to claim 5,
 wherein the second controller in the second storage controller has bit management information for managing information about which bit in the management information is assigned to which second snapshot, and rewrites, by updating the bit management information, the information for the common bit to information for a corresponding dedicated bit via background processing.

7. The storage system according to claim 1,
 wherein the host computer stores time information in the request to create a snapshot in the second storage controller,
 wherein the first storage controller extracts the time information stored in the snapshot creation request and transmits it to the second storage controller, and
 wherein the second storage controller stores the time information, transmitted from the first storage controller, while establishing a correspondence relationship with the corresponding second snapshot and provides a user with the time information upon request.

8. The storage system according to 7, wherein the time information is information indicating the time when the host computer issues the snapshot creation request to the first storage controller.

9. A snapshot management method used in a storage system, the storage system comprising a first storage controller and a second storage controller, the first storage controller having a first storage area, a first controller, a pool volume, and a virtual volume, and the second storage controller having a second storage area and a second controller, the method comprising:
   a first step of creating, at regular or irregular time intervals, a first snapshot composed of a data image of the first storage area, which stores data sent from a host computer;
   storing differential data migrated from the first storage device in the pool volume;
   using the virtual volume for restoring a data image of the first storage area at a certain point in time using the data stored in the first storage area at the certain point in time and the differential data stored in the pool volume at the certain point in time,
   wherein the pool volume corresponds to the virtual volume;
   determining whether respective pieces of data constituting the data image of the first storage area at the certain point in time exist in the first storage area or in the pool volume, obtaining the respective pieces of data from the first storage area or the pool volume based on the determination, transferring the respective pieces of data obtained from the first storage area to the second controller, and transferring the respective pieces of data obtained from the pool volume to the second controller via the virtual volume; and
   a second step of creating, in response to a request sent from the host computer via the first storage controller to create a snapshot in the second storage controller, an externally-accessible second snapshot composed of a data image of the second storage area, which stores the respective pieces of data transferred;
   wherein when the request to create the external snapshot in the second storage controller is sent from the host computer, transfer of the differential data to the second storage controller is suspended, and a new first snapshot is created, and differential data for the new first snapshot, together with the untransferred differential data for the previous first snapshot, for which transfer has been suspended, are transferred to the second storage controller, and
   wherein the first step further comprises:
   when the request to create the external snapshot in the second storage controller is sent from the host computer, creating a third bitmap by combining a first bitmap for managing the transfer of the differential data for the new first snapshot created when the first storage controller received the snapshot request, and a second bitmap for managing the untransferred differential data for the previous first snapshot for which transferring has been suspended; and
   transmitting, based on the third bitmap, the differential data for the new first snapshot created at the time of receipt of the snapshot request, together with the untransferred differential data for the previous first snapshot for which the transfer has been suspended, to the second storage controller.

10. The snapshot management method according to claim 9 wherein the second step further comprises:
   creating a third snapshot composed of a data image of the second storage area based on the first snapshot stored in the second storage area; and creating
   the above-referenced second snapshot based on the third snapshot.

11. The snapshot management method according to claim 9 further comprising:
   a third step of creating a new second snapshot based on the existing second snapshot in response to a request to create a snapshot.

12. The snapshot management method according to claim 11 wherein the third step further comprises:
   obtaining management information composed of a plurality of bits corresponding to predetermined units in the second storage area, and managing information about whether there is any difference between the data content of the second storage area and the created second snapshot based on the value of a bit assigned to the second snapshot in the relevant management information; and
   when a new second snapshot is created based on the existing second snapshot, assigning one of the bits included in the management information as a common bit that is used in common by the existing second snapshot and the newly-created second snapshot, and using the common bit to manage information about whether there is any difference between the data content of the second storage area, the existing second snapshot, and the newly-created second snapshot.

13. The snapshot management method according to claim 9 wherein the second step further comprises:
   when a new second snapshot is created, assigning one of the bits in the management information as a dedicated bit for the new second snapshot; and
   after the new second snapshot is created, rewriting the information for the common bit, at an appropriate time, to information for a corresponding dedicated bit via background processing.

14. The snapshot management method according to claim 12 wherein, by updating the bit management information, which is information about which bit in the management information is assigned to which second snapshot rewrites, the information for the common bit is rewritten to information for a corresponding dedicated bit via background processing.

15. The snapshot management method according to claim 9,
   wherein the host computer stores time information in the request to create a snapshot in the second storage controller, and
   wherein in the first and second steps, the first storage controller extracts the time information stored in the snapshot creation request and transmits it to the second storage controller, and
   wherein in the second step, the second storage controller stores the time information, transmitted from the first storage controller, while establishing a correspondence relationship with the corresponding second snapshot and provides a user with the time information when requested.

16. The snapshot management method according to 15 wherein, the time information is information indicating the time when the host computer issues the snapshot creation request to the first storage controller.

* * * * *